(12) United States Patent  
Hashimoto et al.

(10) Patent No.: US 7,199,492 B2
(45) Date of Patent: Apr. 3, 2007

(54) ARMATURE OF LINEAR MOTOR

(75) Inventors: Akira Hashimoto, Tokyo (JP); Yasuki Kimura, Tokyo (JP); Satoshi Yamashiro, Tokyo (JP); Yuji Nakahara, Tokyo (JP); Akira Watarai, Tokyo (JP); Michio Nakamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 368 days.

(21) Appl. No.: 10/870,146

(22) Filed: Jun. 18, 2004

(65) Prior Publication Data

US 2004/0256919 A1    Dec. 23, 2004

(30) Foreign Application Priority Data

Jun. 20, 2003   (JP)   ............................. 2003-175808
Oct. 31, 2003   (JP)   ............................. 2003-371627

(51) Int. Cl.
   *H02K 41/00*   (2006.01)
   *H02K 33/00*   (2006.01)
(52) U.S. Cl. ...................................... 310/12
(58) Field of Classification Search .................. 310/12
   See application file for complete search history.

(56) References Cited

U.S. PATENT DOCUMENTS 6,407,471 B1 *   6/2002   Miyamoto et al. ............ 310/12

6,747,376 B2 *   6/2004   Hashimoto et al. ........... 310/12
6,753,633 B1 *   6/2004   Eberle ......................... 310/216
6,853,099 B2 *   2/2005   Uchida ........................ 310/12
2003/0197432 A1   10/2003   Hashimoto et al.

FOREIGN PATENT DOCUMENTS

| DE | 101 43 870 | * | 4/2003 |
| EP | 1365497 A1 | * | 11/2006 |
| JP | 2000-217334 | | 8/2000 |
| JP | 2000-262035 A | | 9/2000 |
| JP | 2001-145327 | | 5/2001 |
| JP | 2002-95232 | | 3/2002 |
| JP | 2004-7946 | | 1/2004 |
| JP | 2003-153522 A | * | 5/2006 |
| WO | 49701 A1 | * | 2/2000 |

* cited by examiner

*Primary Examiner*—Burton Mullins
(74) *Attorney, Agent, or Firm*—Buchanan Ingersoll & Rooney PC

(57) ABSTRACT

An armature of a linear motor includes a plurality of first magnetic teeth and a plurality of second magnetic teeth, each of the magnetic teeth being formed by laminating multiple tooth elements made of electromagnetic steel sheets. The first magnetic teeth are arranged side by side in a linear form while the second magnetic teeth are located one each between the successive first magnetic teeth. Each of the second magnetic teeth interconnects the two adjacent first magnetic teeth located on both sides.

8 Claims, 23 Drawing Sheets

(a)

(b)

(c)

(d)

(a)

(b)

(a)

(b)

(a)

(b)

ARMATURE OF LINEAR MOTOR

BACKGROUND OF THE INVENTION

1. Field of the Invention

The present invention relates generally to an armature of a linear motor and, more particularly, to an armature of a linear motor that can be manufactured with improved production efficiency, the armature having a reduced weight and producing an increased thrust per weight.

2. Description of the Background Art

A linear motor includes as its principal parts an armature (moving part) and a stator which are disposed face to face with a specific magnetic gap formed in between. The armature includes a plurality of magnetic teeth arranged side by side in a linear form with coils wound around the individual magnetic teeth, each of the magnetic teeth having a laminated armature core block formed by laminating multiple tooth elements made of electromagnetic steel sheets. The stator includes a yoke and a plurality of magnets disposed face to face with the magnetic teeth of the armature separated by the aforementioned magnetic gap from each other.

To wind the coils at high density, an entire armature core is divided into multiple core blocks constituting the magnetic teeth and the coils are wound on the individual magnetic teeth. The armature is formed by assembling the magnetic teeth into a single structure by means of a mounting plate.

Each of the magnetic teeth has a dovetail groove formed in a surface opposite to a surface facing the stator. On the other hand, the mounting plate has projecting mating portions which fit into the dovetail grooves formed in the individual magnetic teeth. The magnetic teeth are assembled together by fitting the projecting mating portions of the mounting plate into the dovetail grooves as disclosed in Japanese Laid-open Patent Publication No. 2000-217334, for example.

The aforementioned construction of the conventional armature formed by assembling a plurality of magnetic teeth into a single structure has a problem in that the mating portions of the mounting plate must be fitted one by one into the dovetail grooves in the individual magnetic teeth and this results in low productivity.

Another problem of the conventional armature is that the aforementioned construction requires the dedicated mounting plate for joining together the individual magnetic teeth, the provision of the mounting plate resulting in an increase in weight and a reduction in thrust per weight ratings of the armature.

SUMMARY OF THE INVENTION

It is an object of the invention to provide an armature of a linear motor employing a structure which makes it possible to improve productivity in a process of assembling and fixing multiple magnetic teeth into a single structure and achieve a reduction in weight of the armature.

According to the invention, an armature of a linear motor includes a plurality of first magnetic teeth arranged side by side in a linear form, each of the first magnetic teeth having a yoke portion and a tooth portion extending from the yoke portion toward a stator of the linear motor, and a plurality of second magnetic teeth each located between the tooth portions of each successive pair of adjacent first magnetic teeth, each of the second magnetic teeth joining the two adjacent first magnetic teeth located on both sides.

The armature of the invention is applicable to a linear motor used in a linear positioning system for a machine tool, for example.

These and other objects, features and advantages of the invention will become more apparent upon reading the following detailed description in conjunction with the accompanying drawings.

BRIEF DESCRIPTION OF THE DRAWINGS

FIGS. 3A, 3B, 3C, 3D, 3E and 3F are diagrams showing the first to third magnetic teeth in which FIGS. 3A, 3C and 3E are front views and FIGS. 3B, 3D and 3F are plan views;

FIGS. 13A, 13B, 13C, 13D, 13E and 13F are diagrams showing the first to third magnetic teeth in which FIGS. 13A, 13C and 13E are front views and FIGS. 13B, 13D and 13F are plan views;

DESCRIPTION OF THE PREFERRED EMBODIMENTS

The invention is now described in detail with reference to specific embodiments thereof which are illustrated in the appended drawings.

First Embodiment

Figure 1:
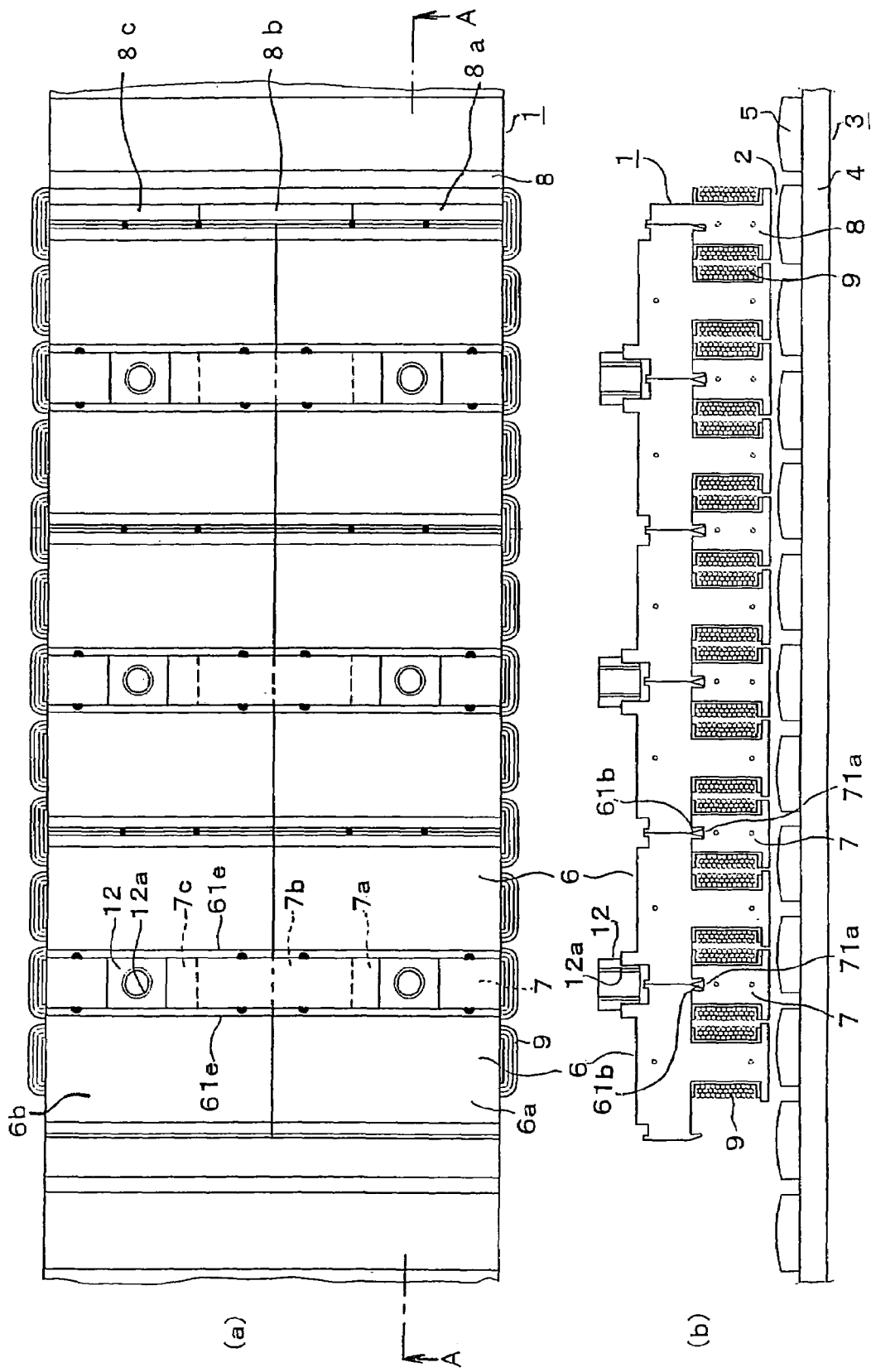
FIG. 1A is a plan view of a linear motor according to a first embodiment of the invention and FIG. 1B is a sectional side view taken along lines A—A of FIG. 1A.

FIG. 1A is a plan view of a linear motor according to a first embodiment of the invention, FIG. 1B is a sectional side view of the linear motor taken along lines A—A of FIG. 1A, and FIGS. 2A–2D are sectional views showing magnetic teeth.

The linear motor of the present embodiment includes an armature (moving part) 1 and a stator 3 which are disposed face to face with a specific magnetic gap 2 formed in between as shown in FIG. 1B.

The stator 3 includes a yoke 4 and a plurality of magnets 5 arranged side by side on and fixed to the yoke 4 in alternately reversed directions to produce alternating polarities. The armature 1 includes a plurality of first magnetic teeth 6, a plurality of second magnetic teeth 7, a third magnetic tooth 8 and driving coils 9 wound around the individual magnetic teeth 6, 7, 8.

Figure 2:
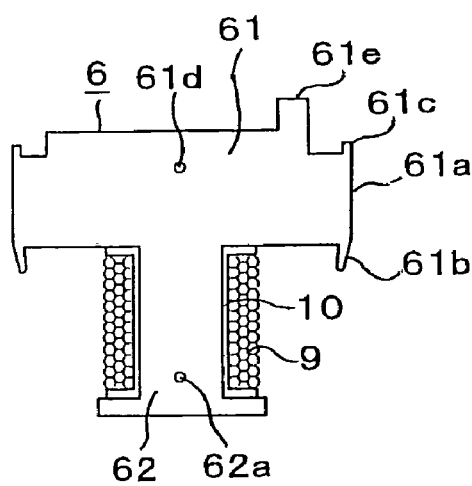
FIGS. 2A, 2B, 2C and 2D are sectional views showing first to third magnetic teeth of an armature of the first embodiment.
Figure 2:
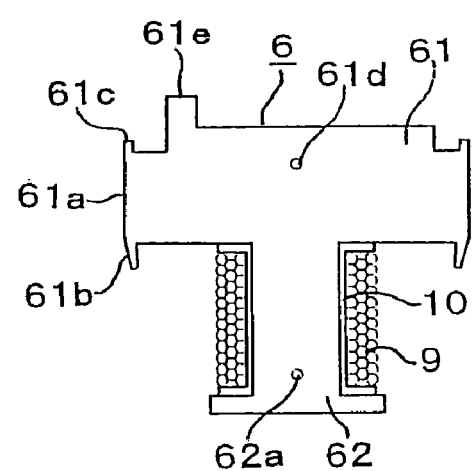
Figure 2:
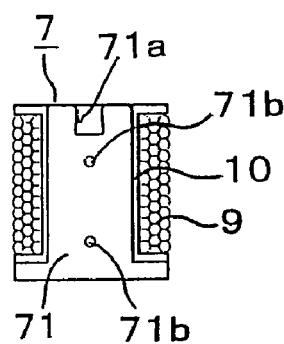
Figure 2:
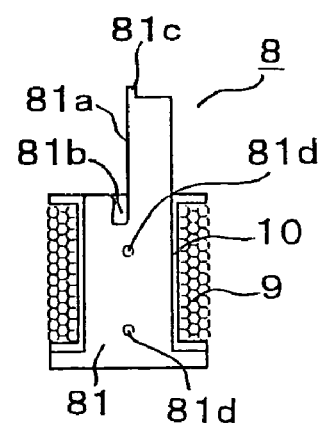

Each of the first magnetic teeth 6 is formed by laminating multiple tooth elements each having a yoke portion 61 and a tooth portion 62 projecting from the yoke portion 61 toward the stator 3 as shown in FIGS. 2A and 2B. The tooth elements are produced by press-cutting an electromagnetic steel sheet. The press-cut tooth elements are stacked and joined together by punching fixing holes 61d, 62a through the stacked steel sheets so that protruding edges raised around the fixing holes 61d, 62a in the successive steel sheets become firmly engaged with one another. The first magnetic tooth 6 has a vertical end surface 61a, a connecting part 61b projecting downward from the vertical end surface 61a and a welding part 61c projecting upward from the vertical end surface 61a on each side of the yoke portion 61. The vertical end surfaces 61a of the successive first magnetic teeth 6 are held in face-to-face contact with one another as shown in FIGS. 1A and 1B. The driving coil 9 is wound around each tooth portion 62 with an insulator 10 placed in between.

The first magnetic tooth 6 further has a fixing bar holding part 61e formed on an upper surface of the yoke portion 61. The fixing bar holding parts 61e of each pair of adjacent first magnetic teeth 6 (FIGS. 2A and 2B) are symmetrically located with respect to their facing vertical end surfaces 61a. A fixing bar 12 is attached to the fixing bar holding parts 61e of each pair of adjacent first magnetic teeth 6 as shown in FIGS. 1A and 1B. The fixing bar 12 is an elongate rodlike member having screw hole blocks in which screw holes 12a used for fixing the armature 1 to a machine tool, for example, are formed.

Each of the second magnetic teeth 7 is formed by laminating multiple tooth elements together constituting a tooth portion 71 as shown in FIG. 2C. As is the case with the first magnetic teeth 6, the tooth elements of each second magnetic tooth 7 are produced by press-cutting an electromagnetic steel sheet. The press-cut tooth elements are stacked and joined together by punching fixing holes 71b through the stacked steel sheets so that protruding edges raised around the fixing holes 71b in the successive steel sheets become firmly engaged with one another. There is formed a dovetail groove-shaped connecting part 71a in an end surface of the tooth portion 71 of each second magnetic tooth 7 opposite to an end surface facing the stator 3. The connecting parts 61b of each successive pair of adjacent first magnetic teeth 6 are fitted into the dovetail groove-shaped connecting part 71a formed in each second magnetic tooth 7. The driving coil 9 is wound around each tooth portion 71 with an insulator 10 placed in between.

The third magnetic tooth 8 is located at an end of the armature 1. The third magnetic tooth 8 is formed by laminating multiple tooth elements together constituting a tooth portion 81 as shown in FIG. 2D. As is the case with the first magnetic teeth 6, the tooth elements of the third magnetic tooth 8 are produced by press-cutting an electromagnetic steel sheet. The press-cut tooth elements are stacked and joined together by punching fixing holes 81d through the stacked steel sheets so that protruding edges raised around the fixing holes 81d in the successive steel sheets become firmly engaged with one another. The third magnetic tooth 8 has a cutout portion at one end opposite to an end facing the stator 3, the cutout portion having a vertical end surface 81a, a groove-shaped connecting part 81b extending downward from the vertical end surface 81a and a welding part 81c projecting upward from the vertical end surface 81a. The vertical end surface 81a is held in face-to-face contact with the vertical end surface 61a of the adjacent first magnetic tooth 6. The driving coil 9 is wound around a tooth portion 81 with an insulator 10 placed in between.

Figure 3:
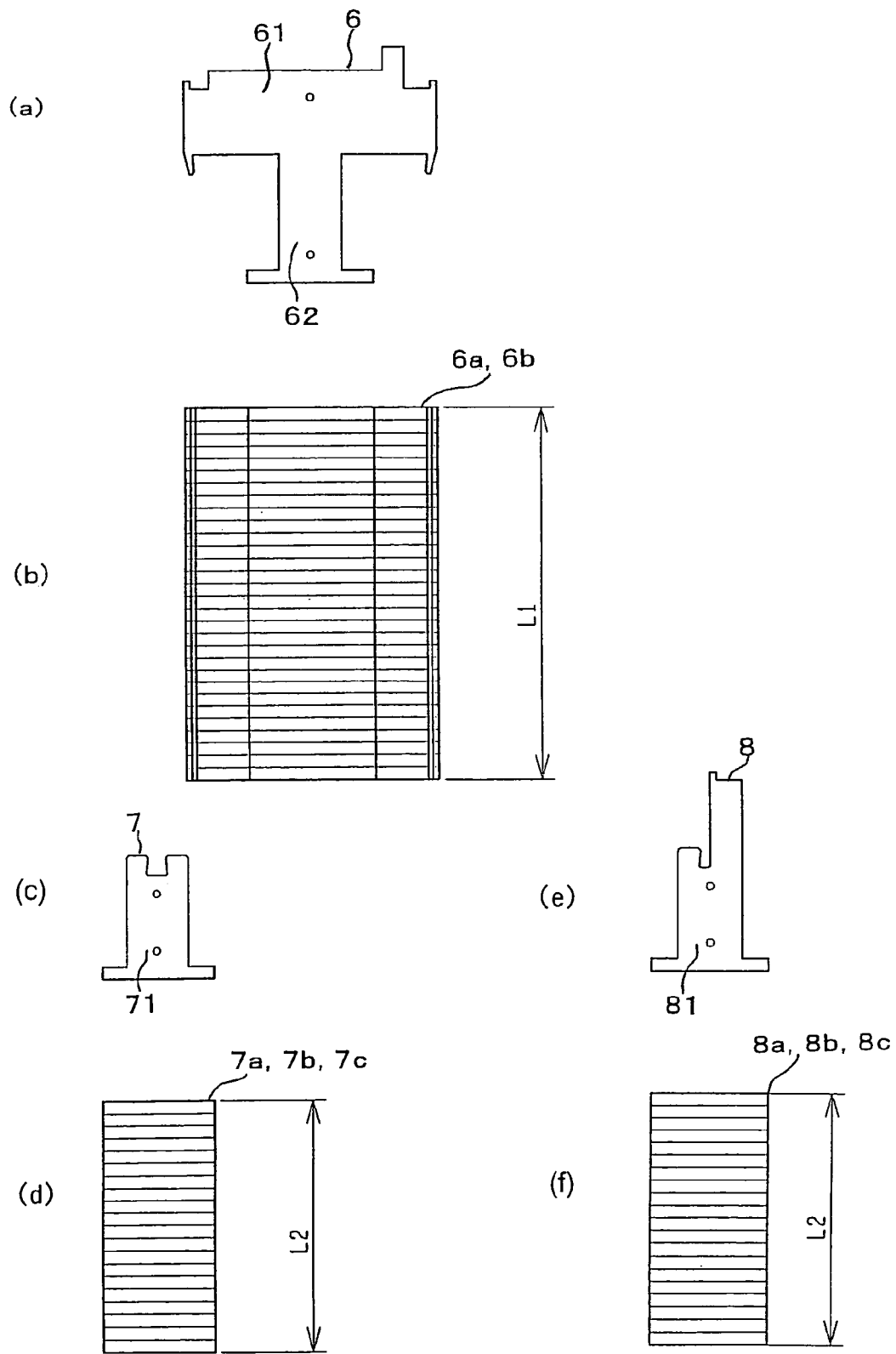

FIGS. 3A–3F are diagrams showing the first to third magnetic teeth 6, 7, 8 in which FIGS. 3A, 3C and 3E are front views and FIGS. 3B, 3D and 3F are plan views. As illustrated in these Figures, each first magnetic tooth 6 is made up of two tooth core sections 6a, 6b each having a length L1 in a direction in which the tooth elements are stacked, each second magnetic tooth 7 is made up of three tooth core sections 7a, 7b, 7c each having a length L2 in a direction in which the tooth elements are stacked, and a third magnetic tooth 8 is made up of three tooth core sections 8a, 8b, 8c each having the same length L2 as the tooth core sections 7a, 7b, 7c in a direction in which the tooth elements are stacked. The first to third magnetic teeth 6, 7, 8 are formed by joining the tooth core sections 6a, 6b, the tooth core sections 7a, 7b, 7c and the tooth core sections 8a, 8b, 8c in their longitudinal direction (tooth element stacking direction), respectively, as shown in FIG. 1A.

A procedure for assembling the armature 1 is now explained referring, in particular, to FIGS. 4A, 4B, 5A, 5B, 6A and 6B which are sectional diagrams showing the assembling procedure.

Each of the first magnetic teeth 6 is formed by joining the two tooth core sections 6a, 6b each having the length L1 in their longitudinal direction (tooth element stacking direction). Similarly, each of the second magnetic teeth 7 is formed by joining the three tooth core sections 7a, 7b, 7c each having the length L2 in their longitudinal direction, and a the third magnetic tooth 8 is formed by joining the three tooth core sections 8a, 8b, 8c each having the length L2 in their longitudinal direction. Then, the driving coils 9 are wound on the tooth portions 62, 71, 81 of the individual first to third magnetic teeth 6, 7, 8 with the insulators 10 placed between the driving coils 9 and the tooth portions 62, 71, 81.

Figure 4:
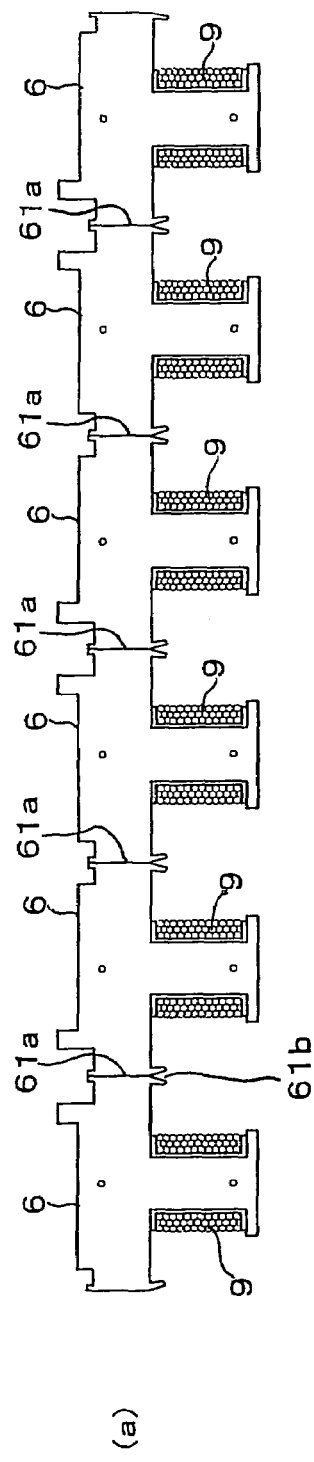
FIGS. 4A and 4B are sectional views showing a procedure for assembling the armature of the first embodiment.
Figure 4:
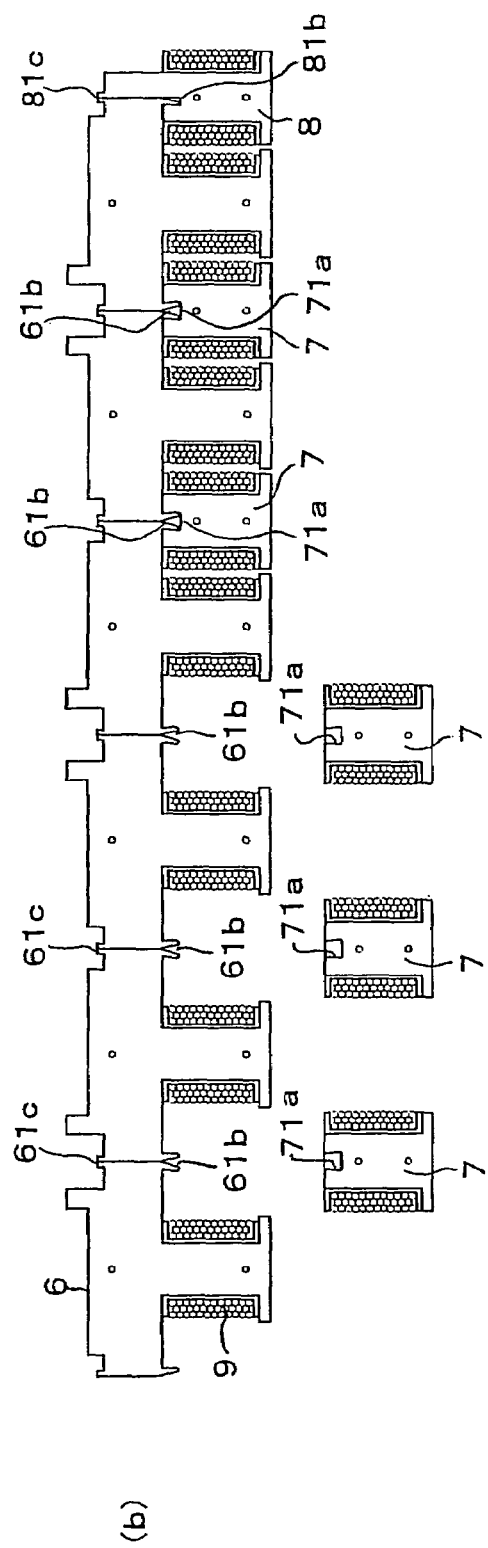

The first magnetic teeth 6 on which the driving coils 9 have been wound are arranged in line with their vertical end surfaces 61a placed in face-to-face contact with one another as shown in FIG. 4A.

The second magnetic teeth 7 on which the driving coils 9 have been wound are then placed between the tooth portions 62 of the successive first magnetic teeth 6 and the dovetail groove-shaped connecting parts 71a of the second magnetic teeth 7 are fitted on the connecting parts 61b projecting downward from lower ends of the vertical end surfaces 61a of the first magnetic teeth 6 as illustrated in FIG. 4B. As the connecting parts 71a of the second magnetic teeth 7 are fitted on the connecting parts 61b of the successive first magnetic teeth 6 in this way, the first magnetic teeth 6 arranged in a linear array are securely joined to one another. The third magnetic tooth 8 is also fitted to an end of the linear array of the first magnetic teeth 6 as the groove-shaped connecting parts 81b of the third magnetic tooth 8 is fitted on the downward projecting connecting parts 61b of the first magnetic tooth 6 at an end of the linear array at the same time.

Figure 5:
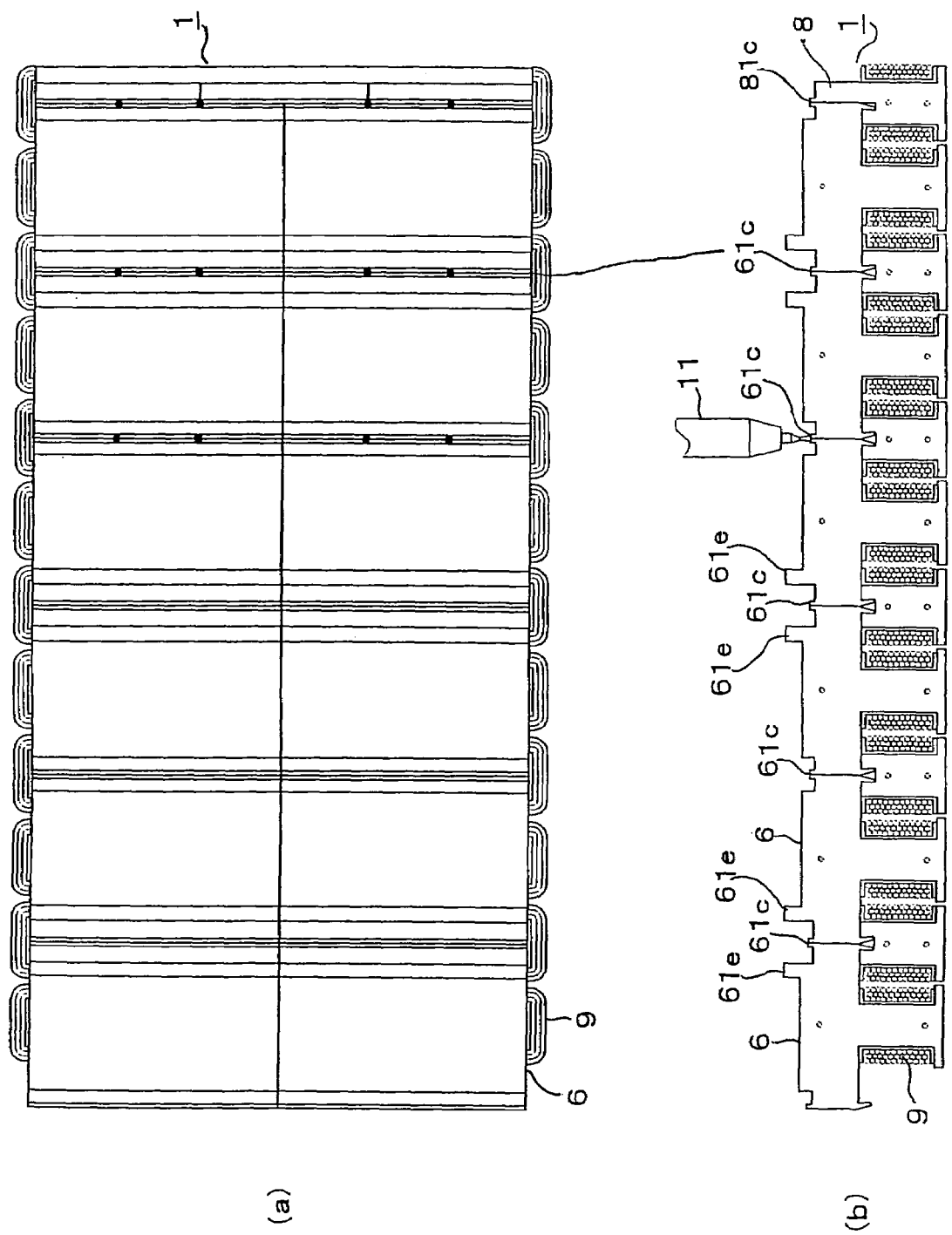
FIGS. 5A and 5B are sectional views showing also the procedure for assembling the armature of the first embodiment.

Next, to join the successive first magnetic teeth 6 with one another and the first magnetic teeth 6 at an end with the third magnetic tooth 8 more securely, the upward projecting welding parts 61c of each successive pair of adjacent first magnetic teeth 6 and the upward projecting welding parts 61c, 81c of the adjacent first and third magnetic teeth 6, 8 are welded by use of a tungsten inert gas (TIG) welding machine 11, for example, as shown in FIGS. 5A and 5B. While this welding process serves to join the first and third magnetic teeth 6, 8 more securely, the process is not absolutely necessary for assembling the armature 1.

Figure 6:
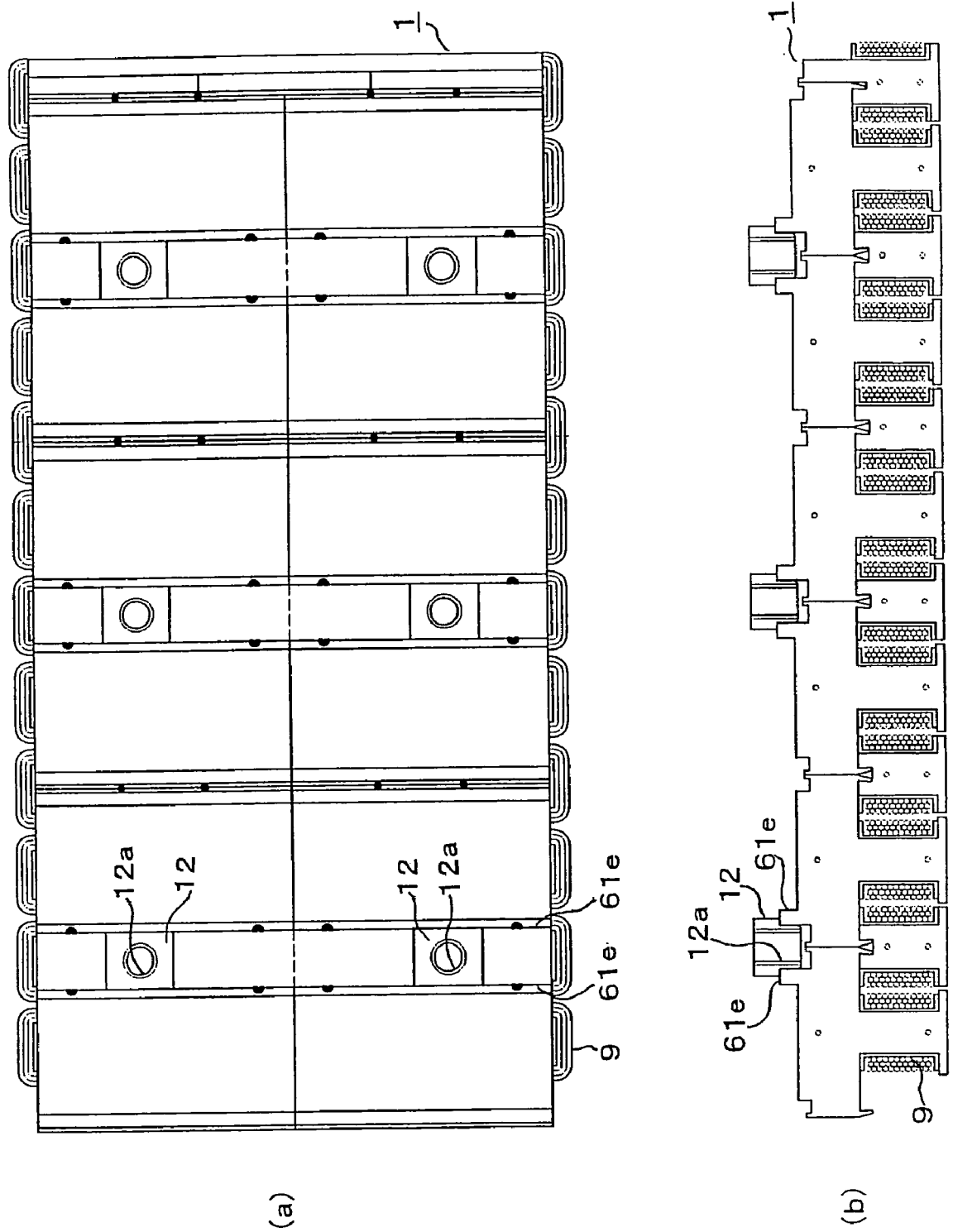
FIGS. 6A and 6B are sectional views showing also the procedure for assembling the armature of the first embodiment.

Referring next to FIGS. 6A and 6B, each fixing bar 12 in which the screw holes 12a for fixing the armature 1 assembled as described above to equipment like a machine tool are formed is inserted between the fixing bar holding parts 61e of the adjacent first magnetic teeth 6 and affixed to the armature 1 by TIG welding, for instance.

As illustrated in the foregoing discussion, the individual second magnetic teeth 7 are fitted between the tooth portions 62 of the adjacent first magnetic teeth 6 and the successive first magnetic teeth 6 are joined to one another by the second magnetic teeth 7 in the present embodiment. This construction of the embodiment helps improve production efficiency compared to the earlier-mentioned conventional construction as the first to third magnetic teeth 6, 7, 8 are joined to one another with a reduced number of joints, that is, one joint per two magnetic teeth.

The aforementioned construction of the present embodiment is advantageous in that the armature 1 can be easily assembled by fitting the groove-shaped connecting parts 71a of the second magnetic teeth 7 and the groove-shaped connecting parts 81b of the third magnetic tooth 8 on the downward projecting connecting parts 61b of the first magnetic teeth 6.

As already mentioned, the first to third magnetic teeth 6, 7, 8 are individually formed by joining the multiple tooth core sections. This construction of the embodiment offers another advantage that the output power of the linear motor can be easily varied as necessary by varying the number of tooth core sections joined together for forming each of the magnetic teeth 6, 7, 8.

When a tooth core section is formed by stacking a large number of tooth elements, errors in the thickness of the individual tooth elements might accumulate in their stacking direction causing the laminated tooth core section to become inclined or twisted when completed. It is possible to avoid such inclination and twisting of the first to third magnetic teeth 6, 7, 8 in this embodiment because the individual magnetic teeth 6, 7, 8 are formed by joining the multiple tooth core sections.

To produce a magnetic tooth having a large tooth element stacking thickness, it is generally necessary to prepare a large-sized lower die for stacking a large number of tooth elements. In this embodiment, the individual magnetic teeth 6, 7, 8 are formed by joining the multiple tooth core sections each having a specified stacking thickness (L1 or L2). It is therefore possible to produce magnetic teeth having a large tooth element stacking thickness by using a relatively small-sized lower die according to the embodiment of the invention.

As can be seen from FIG. 1A, a joint between the tooth core sections 6a, 6b of each first magnetic tooth 6, joints between the tooth core sections 7a, 7b and 7c of each second magnetic tooth 7 and joints between the tooth core sections 8a, 8b and 8c of each third magnetic tooth 8 are arranged in a staggered pattern (not in line) in plan view. This staggered arrangement of the joints serves to minimize a reduction in the structural strength of each first magnetic tooth 6 at the joint between the two tooth core sections 6a and 6b.

The fixing bars 12 in which the screw holes 12a are formed are attached to the armature 1 so that the armature 1 can be affixed to a machine tool or the like. This arrangement of the embodiment serves to reduce the weight of the armature 1 and increase its thrust-to-weight ratio.

While the first to third magnetic teeth 6, 7, 8 are individually formed by joining the multiple tooth core sections in the first embodiment described above, it is needless to say that the first to third magnetic teeth 6, 7, 8 need not necessarily be divided into the multiple tooth core sections in a case where the individual magnetic teeth 6, 7, 8 have a small tooth element stacking thickness or the output power rating of the linear motor is limited.

Second Embodiment

Figure 7:
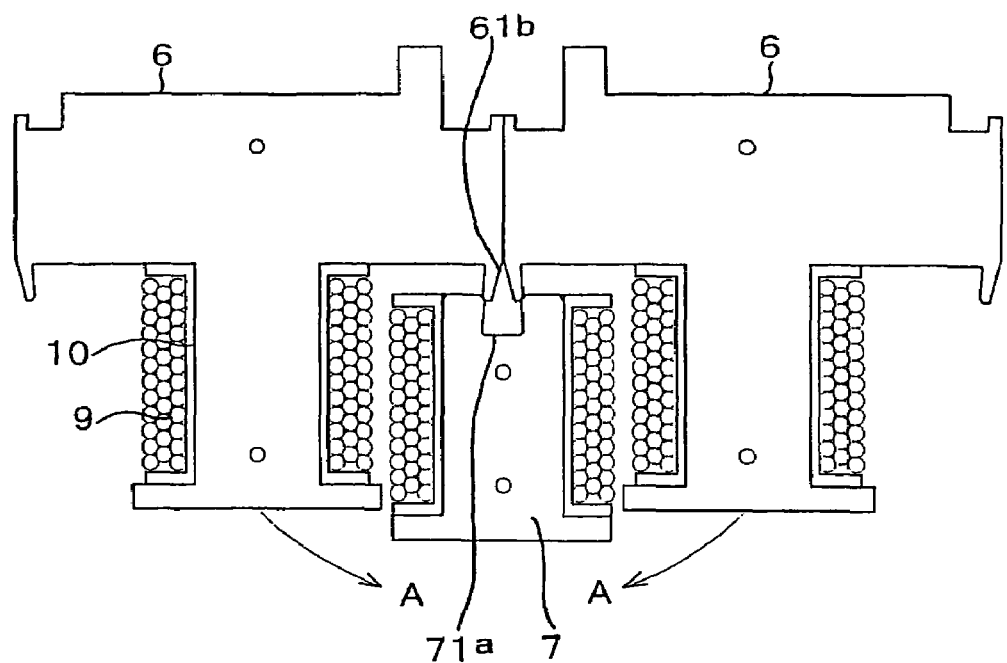
FIG. 7 is an enlarged sectional view showing the first and second magnetic teeth of the first embodiment.

In the aforementioned first embodiment, each second magnetic tooth 7 is inserted between the adjacent first magnetic teeth 6 with the dovetail groove-shaped connecting parts 71a of each second magnetic tooth 7 fitted on the projecting connecting parts 61b of the first magnetic teeth 6. When each second magnetic tooth 7 is inserted between the adjacent first magnetic teeth 6 in this way, the first magnetic teeth 6 are apt to incline in directions shown by arrows A in FIG. 7, potentially jeopardizing ease of assembly. A second embodiment of the invention described below is intended particularly to prevent inclination of the first magnetic teeth 6 in the arrow A directions.

Figure 8:
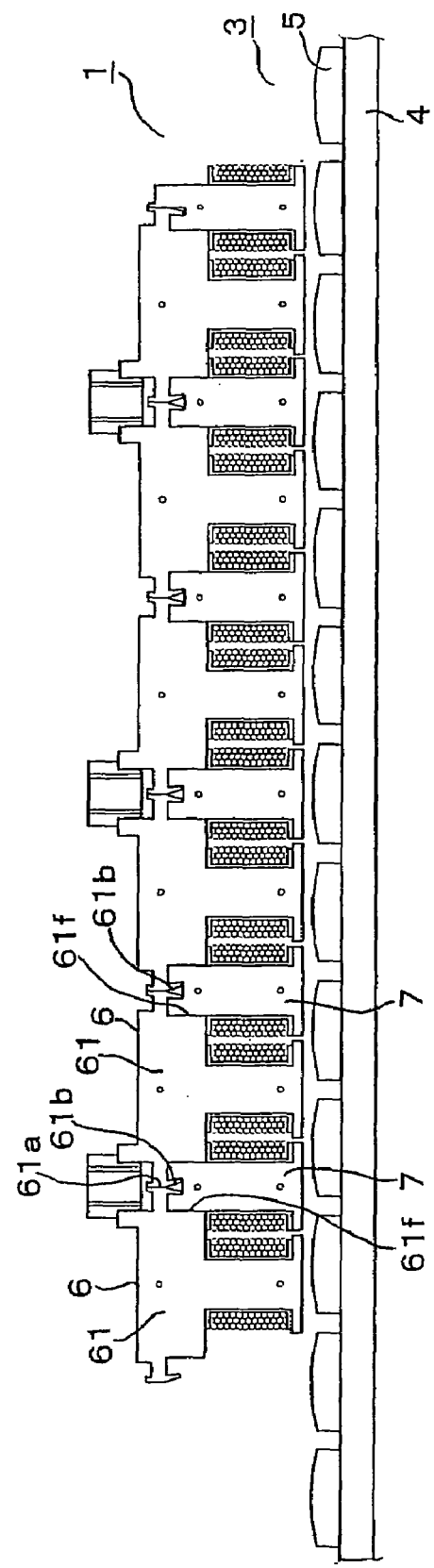
FIG. 8 is a sectional view of a linear motor according to a second embodiment of the invention.
Figure 9:
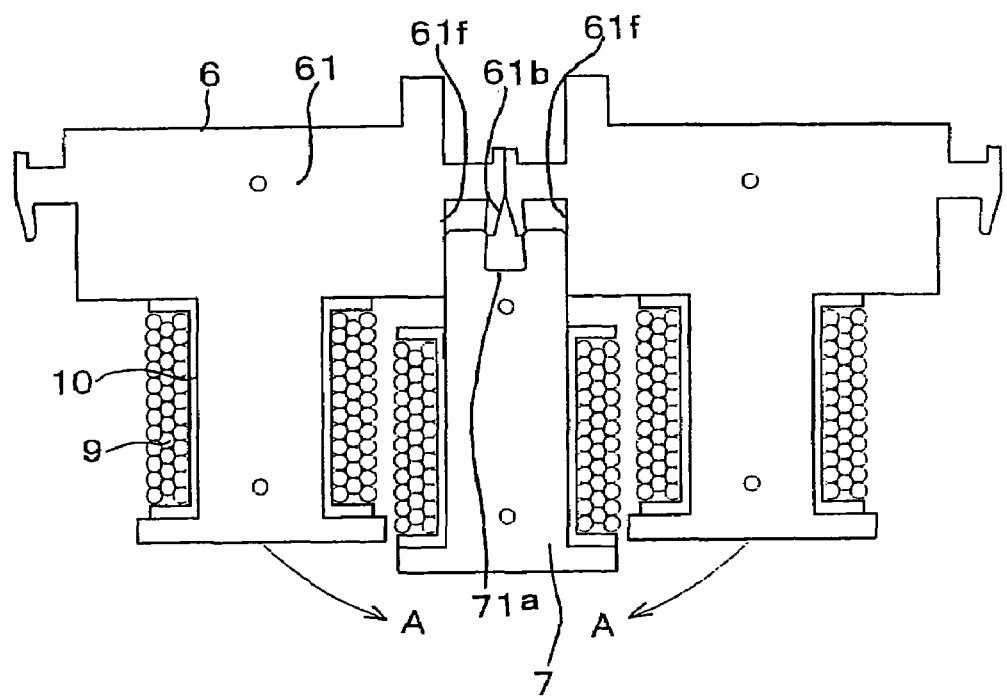
FIG. 9 is an enlarged sectional view showing part of an armature of the linear motor of FIG. 8.
Figure 10:
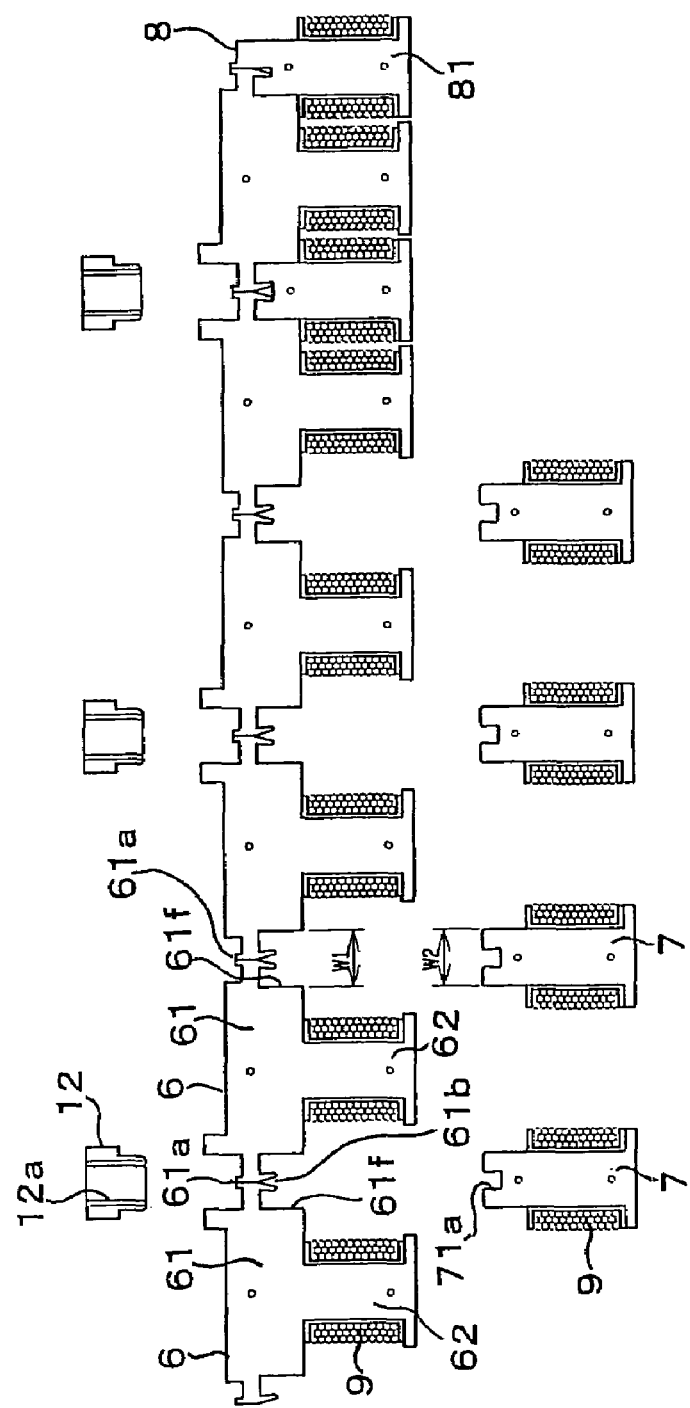
FIG. 10 is a sectional view showing a procedure for assembling the armature of the second embodiment.

FIG. 8 is a sectional view of a linear motor according to the second embodiment of the invention, FIG. 9 is an enlarged sectional diagram showing part of an armature 1 of the linear motor of FIG. 8, and FIG. 10 is a sectional diagram showing a procedure for assembling the armature 1 of the second embodiment, in which elements identical or similar to those of the first embodiment are designated by the same reference numerals.

In this embodiment, each of the first magnetic teeth 6 has cutouts 61f at both sides of the yoke portion 61 as shown in FIGS. 8 and 9. The width of each cutout 61f is such that the width W1 of a groove-shaped channel formed by the cutouts 61f between two adjacent first magnetic teeth 6 when the facing vertical end surfaces 61a of the two adjacent first magnetic teeth 6 are brought into mutual contact is approximately equal to the width W2 of the second magnetic tooth 7 which is inserted into the groove-shaped channel as shown in FIG. 10.

Although the two adjacent first magnetic teeth 6 are forced to swing in the arrow A directions as shown in FIG. 9 when the second magnetic tooth 7 is fitted between the first magnetic teeth 6, an upper portion of the second magnetic tooth 7 inserted into the groove-shaped channel formed between the adjacent first magnetic teeth 6 prevents the first magnetic teeth 6 from swinging in the arrow A directions. Therefore, the aforementioned construction of the second embodiment serves to prevent the first magnetic teeth 6 from inclining sideways, thereby ensuring ease of assembly.

Furthermore, the construction of this embodiment, in which the second magnetic teeth 7 are inserted into the respective groove-shaped channels, serves to increase contact areas between the first and second magnetic teeth 6, 7 and this makes it possible to suppress an increase in magnetic loss (reluctance) which may occur at joints between the first and second magnetic teeth 6, 7.

Third Embodiment

Figure 11:
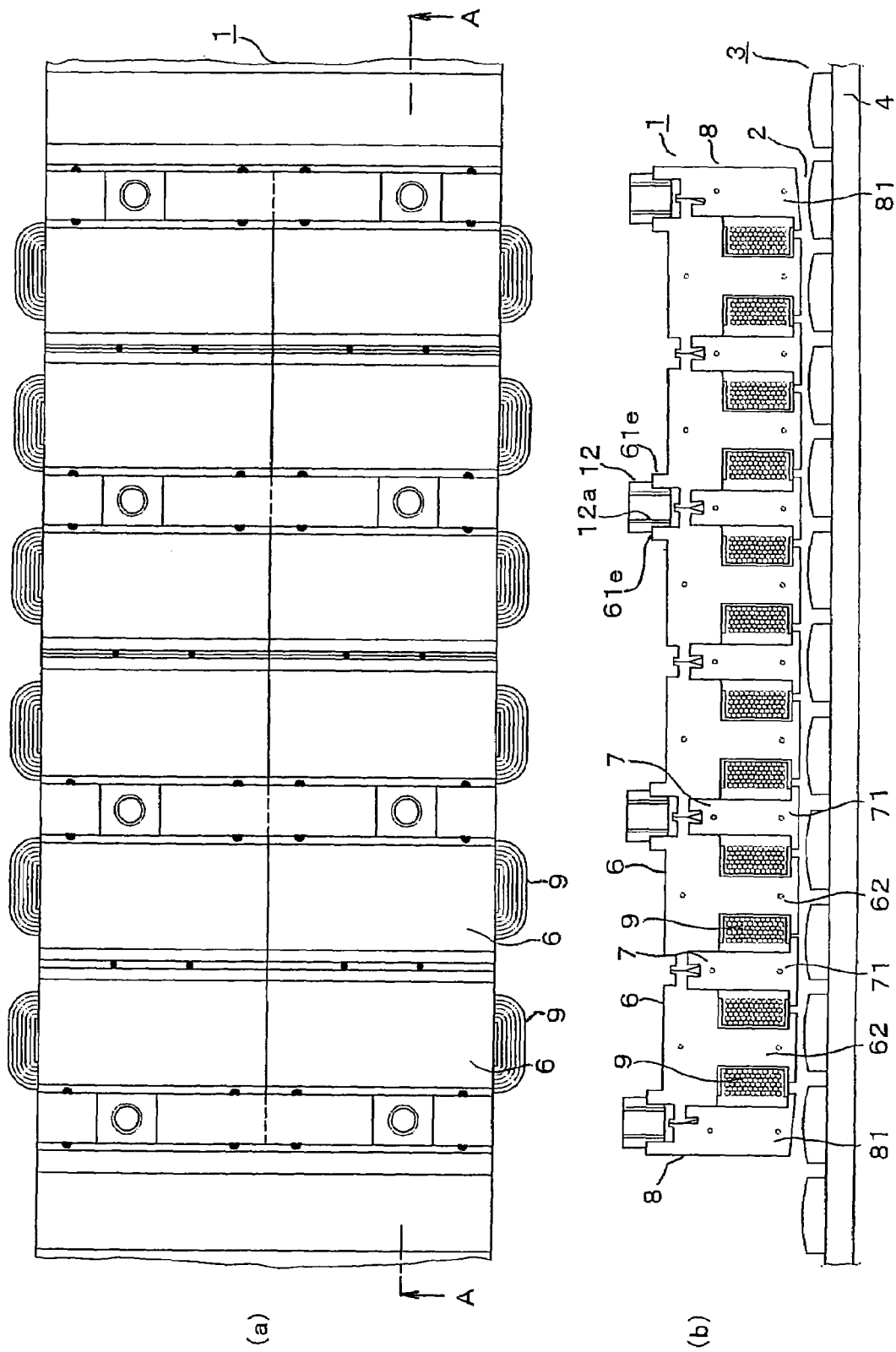
FIG. 11A is a plan view of a linear motor according to a third embodiment of the invention and FIG. 11B is a sectional side view taken along lines A—A of FIG. 11A.
Figure 12:
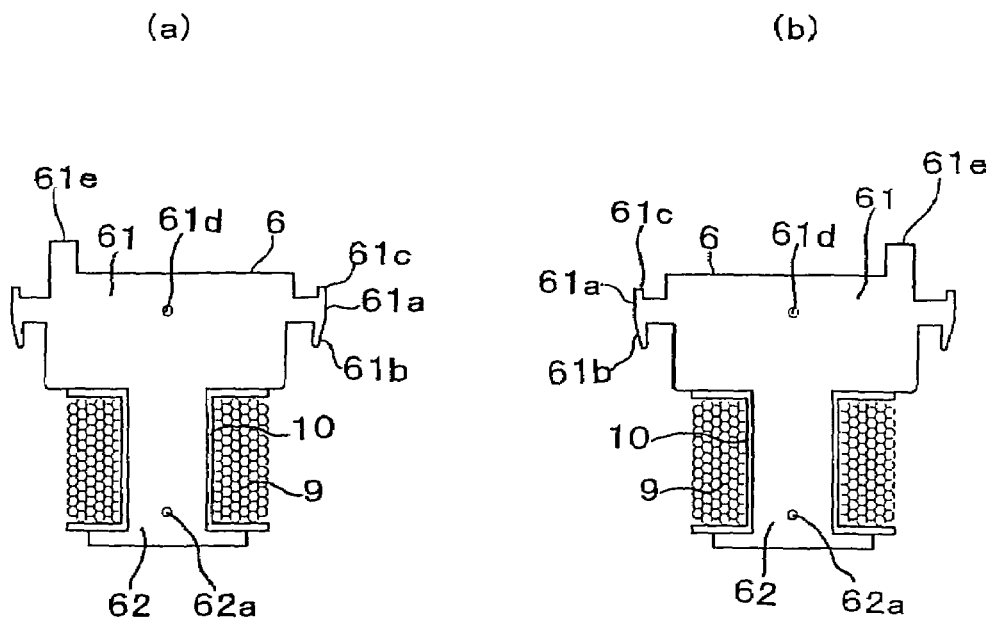
FIGS. 12A and 12B are enlarged sectional views of first magnetic teeth of an armature of the third embodiment.

FIG. 11A is a plan view of a linear motor according to a third embodiment of the invention, FIG. 11B is a sectional side view of the linear motor taken along lines A—A of FIG. 11A, FIGS. 12A and 12B are enlarged sectional views of first magnetic teeth 6 of an armature 1 used in the linear motor of the third embodiment, and FIGS. 13A–13F are diagrams showing the first to third magnetic teeth 6, 7, 8, in which elements identical or similar to those of the foregoing embodiments are designated by the same reference numerals.

In this embodiment, the driving coils 9 are wound around the tooth portions 62 of the first magnetic teeth 6 only, and not around the second magnetic teeth 7 or the third magnetic teeth 8 as shown in FIGS. 11A and 11B.

In this construction, the first magnetic teeth 6 on which the driving coils 9 are wound function as main magnetic teeth while the second magnetic teeth 7 on which no coils are wound function as auxiliary magnetic teeth for suppressing cogging force and force ripples. The third magnetic teeth 8 located at both ends of the armature 1 function as auxiliary teeth for suppressing end effect cogging force.

Each of the first magnetic teeth 6 is formed by laminating multiple tooth elements each having a yoke portion 61 and a tooth portion 62 projecting from the yoke portion 61 toward the stator 3 as shown in FIGS. 11B, 12A and 12B. As is the case with the first embodiment, the tooth elements are stacked and joined together by punching fixing holes 61d, 62a through the stacked tooth elements so that protruding edges raised around the fixing holes 61d, 62a in the successive tooth elements become firmly engaged with one another. The first magnetic tooth 6 has a vertical end surface 61a, a connecting part 61b projecting downward from the vertical end surface 61a and a welding part 61c projecting upward from the vertical end surface 61a on each side. The vertical end surfaces 61a of the adjacent first magnetic teeth 6 are held in face-to-face contact with one another as shown in FIGS. 11A and 11B. The driving coil 9 is wound around each tooth portion 62 with an insulator 10 placed in between.

The first magnetic tooth 6 further has a fixing bar holding part 61e formed on an upper surface of the yoke portion 61. The fixing bar holding parts 61e of each pair of adjacent first magnetic teeth 6 (FIGS. 12A and 12B) are symmetrically located with respect to their facing vertical end surfaces 61a. A fixing bar 12 is attached to the fixing bar holding parts 61e of each pair of adjacent first magnetic teeth 6 as shown in FIGS. 11A and 11B. The fixing bar 12 is an elongate rodlike member having screw hole blocks in which screw holes 12a used for fixing the armature 1 to a machine tool, for example, are formed.

Figure 13:
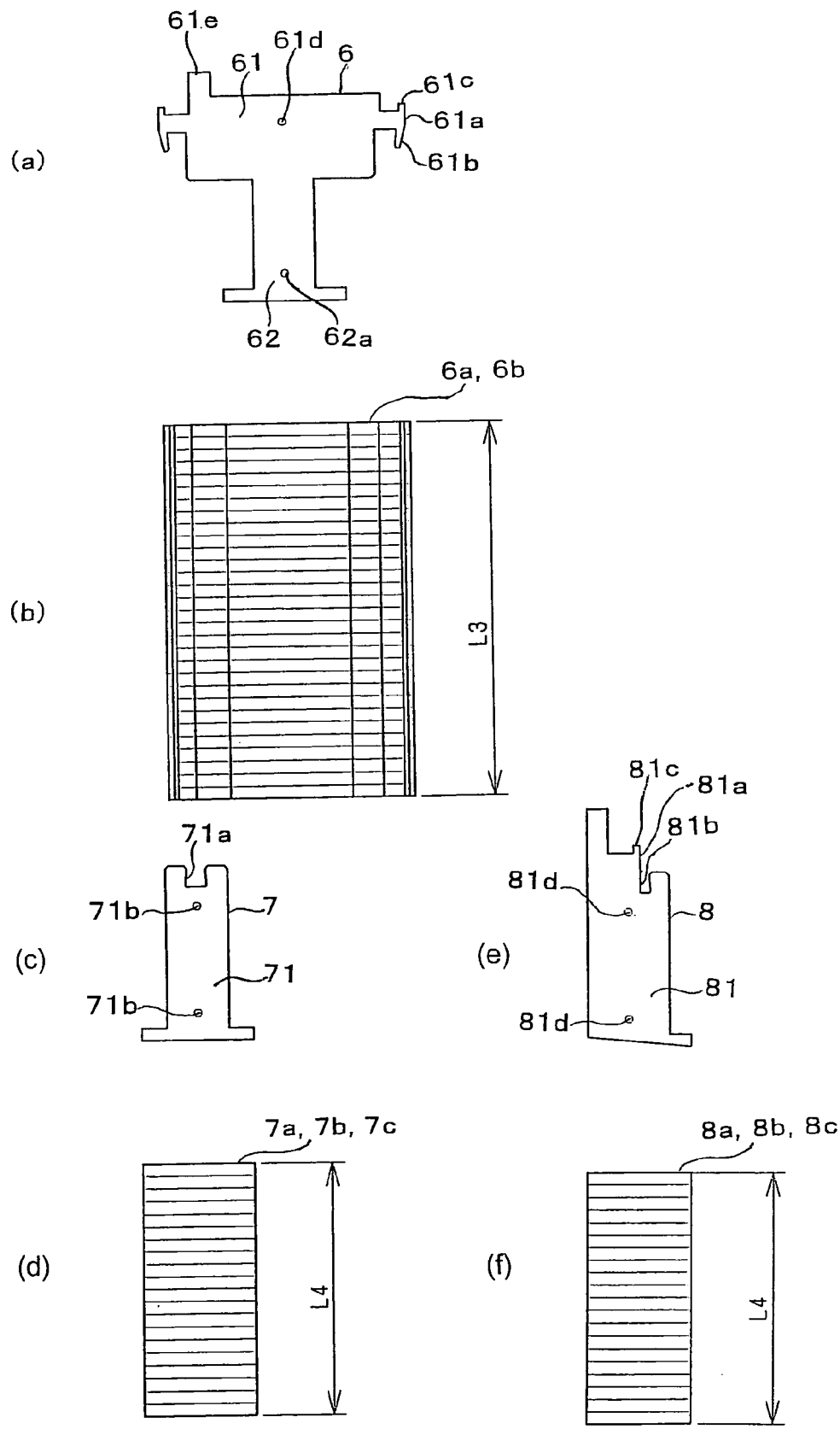

FIGS. 13A–13F are diagrams showing the first to third magnetic teeth 6, 7, 8 in which FIGS. 13A, 13C and 13E are front views and FIGS. 13B, 13D and 13F are plan views. As illustrated in these Figures, each first magnetic tooth 6 is made up of two tooth core sections 6a, 6b each having a length L3 in a direction in which the tooth elements are stacked, each second magnetic tooth 7 is made up of three tooth core sections 7a, 7b, 7c each having a length L4 in a direction in which the tooth elements are stacked, and each third magnetic tooth 8 is made up of three tooth core sections 8a, 8b, 8c each having the same length L4 as the tooth core sections 7a, 7b, 7c in a direction in which the tooth elements are stacked. The first to third magnetic teeth 6, 7, 8 are formed by joining the tooth core sections 6a, 6b, the tooth core sections 7a, 7b, 7c and the tooth core sections 8a, 8b, 8c in their longitudinal direction (tooth element stacking direction), respectively, as shown in FIG. 11A.

Figure 14:
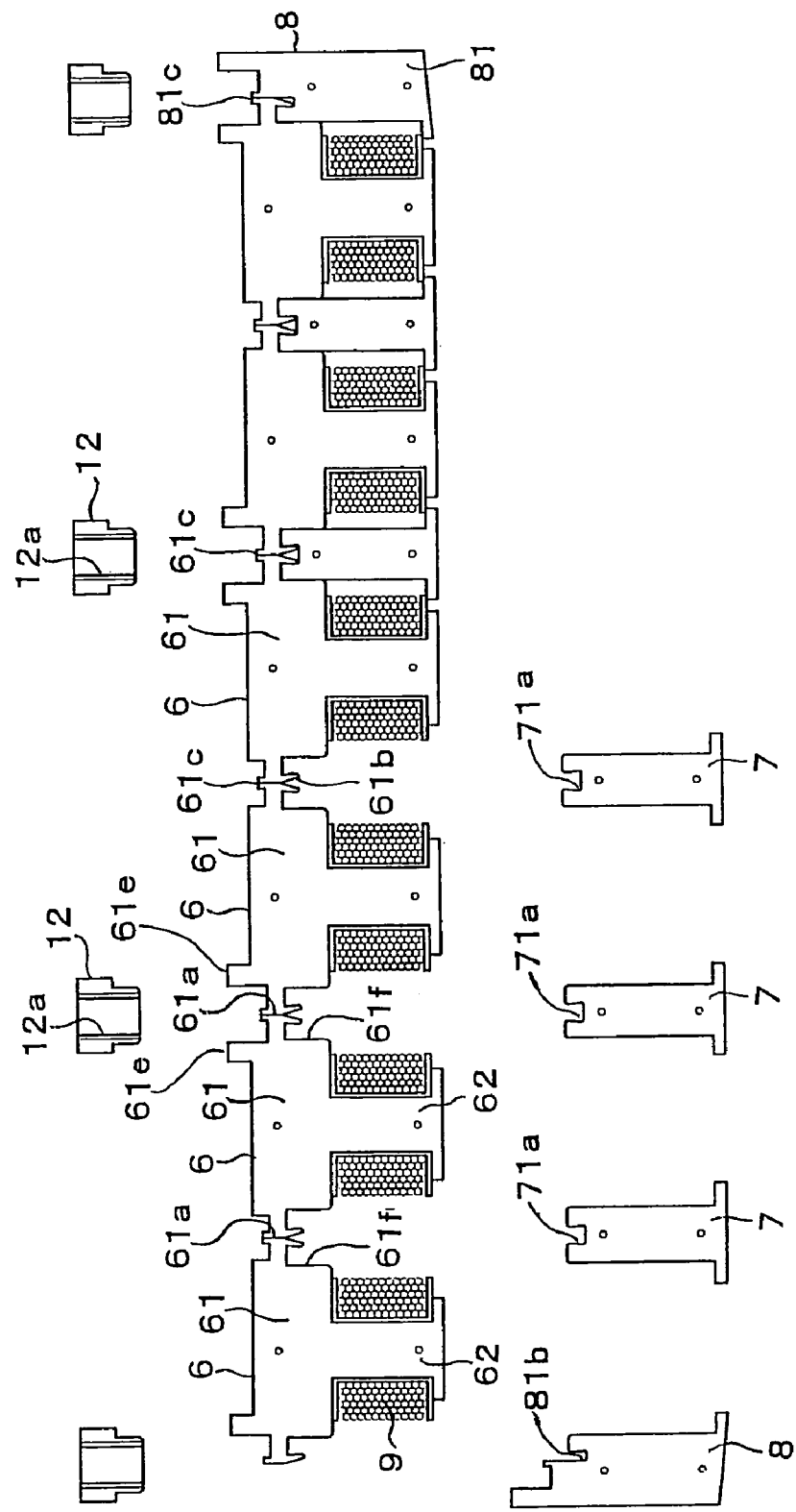
FIG. 14 is a sectional view showing a procedure for assembling the armature of the third embodiment.

A procedure for assembling the armature 1 is now explained referring, in particular, to FIG. 14 which is a sectional diagram showing the assembling procedure.

Each of the first magnetic teeth 6 is formed by joining the two tooth core sections 6a, 6b each having the length L1 in their longitudinal direction (tooth element stacking direction) and the driving coils 9 are wound on the tooth portions 62 of the individual first magnetic teeth 6 with the insulators 10 placed between the driving coils 9 and the tooth portions 62.

The first magnetic teeth 6 on which the driving coils 9 have been wound are arranged in line with their vertical end surfaces 61a placed in face-to-face contact with one another as shown in FIG. 14.

The groove-shaped connecting parts 71a formed in the three tooth core sections 7a, 7b, 7c constituting each of the second magnetic teeth 7 are fitted on the downward projecting connecting parts 61b of successive pairs of adjacent first magnetic teeth 6, the second magnetic teeth 7 forming the auxiliary magnetic teeth. As the connecting parts 71a of the second magnetic teeth 7 are fitted on the connecting parts 61b of the successive first magnetic teeth 6 in this way, the first magnetic teeth 6 arranged in a linear array are securely joined to one another. The groove-shaped connecting parts 81b formed in the three tooth core sections 8a, 8b, 8c constituting each of the third magnetic teeth 8 are also fitted on the downward projecting connecting parts 61b of the two first magnetic teeth 6 at both ends of the linear array at the same time, the third magnetic teeth 8 forming the auxiliary teeth.

Next, to join the successive first magnetic teeth 6 with one another and the first magnetic teeth 6 at both ends with the third magnetic teeth 8 more securely, the upward projecting welding parts 61c of each successive pair of adjacent first magnetic teeth 6 and the upward projecting welding parts 61c, 81c of the adjacent first and third magnetic teeth 6, 8 are welded by use of a TIG welding machine (not shown), for example. While this welding process serves to join the first and third magnetic teeth 6, 8 more securely, the process is not absolutely necessary for assembling the armature 1.

Each fixing bar 12 in which the screw holes 12a for fixing the armature 1 assembled as described above to equipment like a machine tool are formed is inserted between the fixing bar holding parts 61e of the adjacent first magnetic teeth 6 and affixed to the armature 1 by TIG welding, for instance.

As illustrated in the foregoing discussion, the individual second magnetic teeth 7 are fitted between the tooth portions 62 of the adjacent first magnetic teeth 6 and the successive first magnetic teeth 6 are joined to one another by the second magnetic teeth 7 in the present embodiment. This construction of the embodiment helps improve production efficiency compared to the earlier-mentioned conventional construction as the first to third magnetic teeth 6, 7, 8 are joined to one another with a reduced number of joints, that is, one joint per two magnetic teeth.

The aforementioned construction of the present embodiment is advantageous in that the armature 1 can be easily assembled by fitting the groove-shaped connecting parts 71a of the second magnetic teeth 7 and the groove-shaped connecting parts 81b of the third magnetic teeth 8 on the downward projecting connecting parts 61b of the first magnetic teeth 6.

The tooth core sections 7a, 7b, 7c constituting each second magnetic tooth 7 and the tooth core sections 8a, 8b, 8c constituting each third magnetic tooth 8 are short mechanical parts divided in the tooth element stacking direction as shown in FIGS. 13A–13F. Since the second and third magnetic teeth 7, 8 are joined to the first magnetic teeth 6 by fitting the connecting parts 71a, 81b of these short mechanical parts on the connecting parts 61b of the first magnetic teeth 6, the armature 1 can be easily assembled without the need for applying a large force.

Furthermore, since the driving coils 9 are wound around the first magnetic teeth 6 only, coil winding time is reduced in this embodiment.

While the driving coils 9 are wound around the first magnetic teeth 6 only in the present embodiment, the same advantageous effect as described above is obtained even when the driving coils 9 are wound around the second and third magnetic teeth 7, 8 only, and not around the first magnetic teeth 6.

Fourth Embodiment

Figure 15:
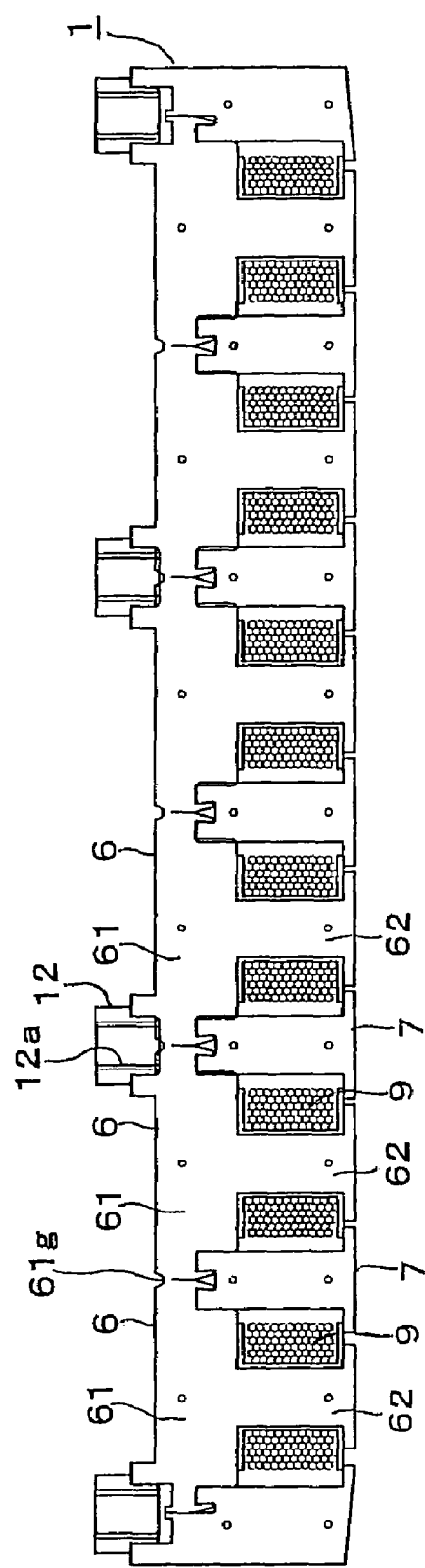
FIG. 15 is a sectional view of an armature of a linear motor according to a fourth embodiment of the invention.
Figure 16:
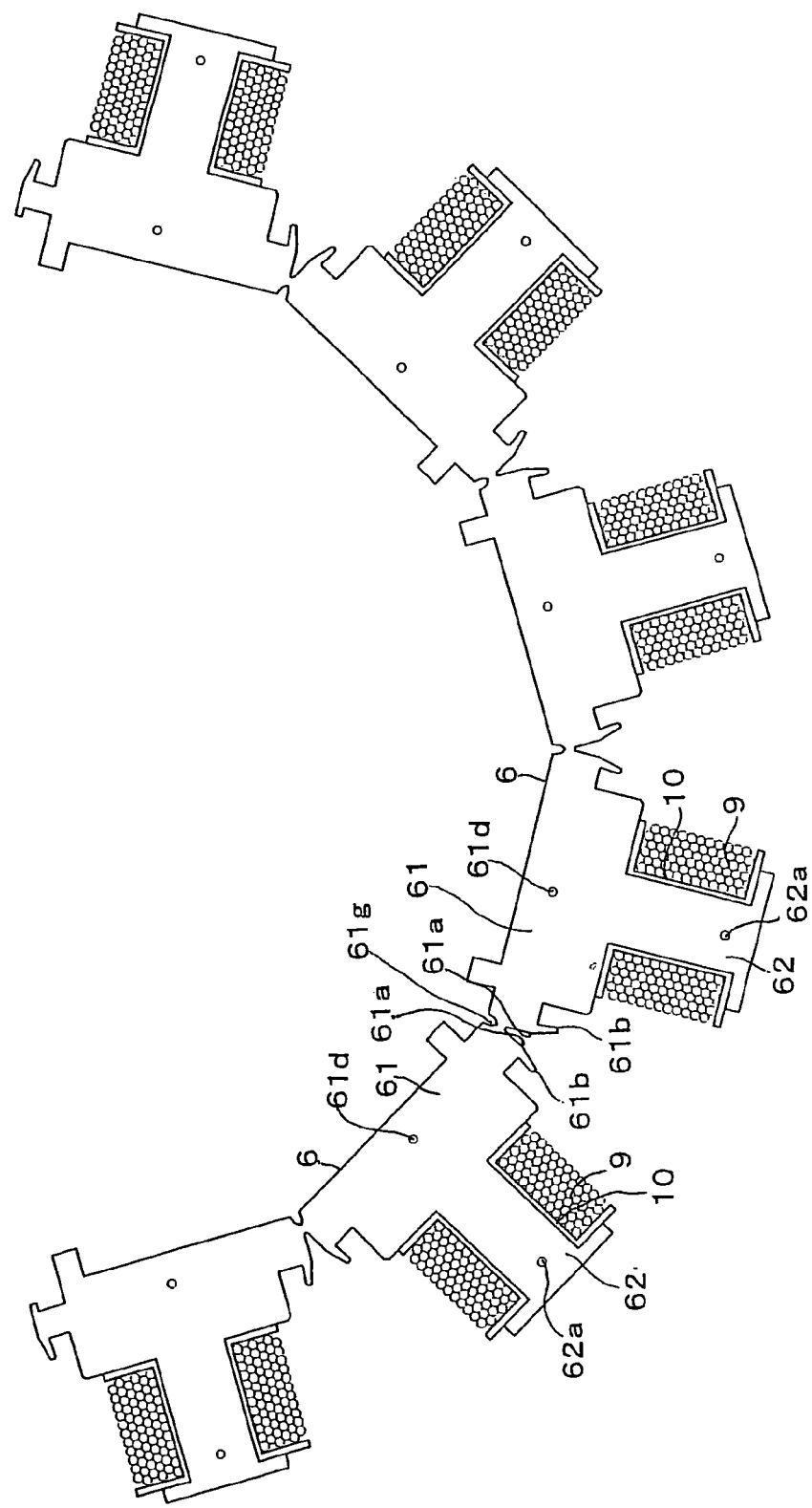
FIG. 16 is a sectional view showing a procedure for assembling the armature of the fourth embodiment.
Figure 17:
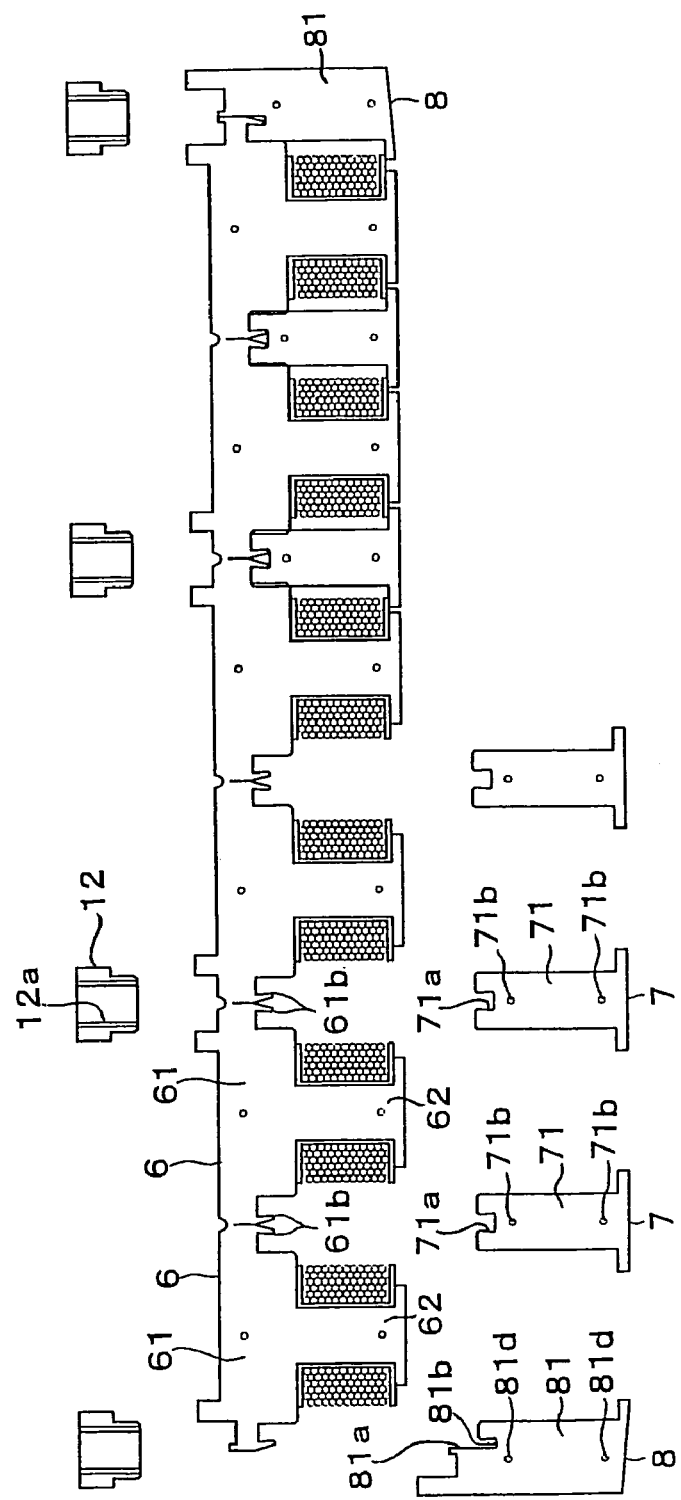
FIG. 17 is a sectional view showing also the procedure for assembling the armature of the fourth embodiment.

FIG. 15 is a sectional view of an armature 1 of a linear motor according to a fourth embodiment of the invention, FIGS. 16 and 17 are sectional diagrams showing a procedure for assembling the armature 1 of the fourth embodiment, in which elements identical or similar to those of the foregoing embodiments are designated by the same reference numerals.

In this embodiment, tooth elements constituting successive first magnetic teeth 6 are linked one after another like a chain by flexible joints 61g as shown in FIG. 15. The chain of the first magnetic teeth 6 can be bent at the joints 61g to form an arc as shown in FIG. 16 so that the distance between the tooth portions 62 of the successive first magnetic teeth 6 are increased.

The driving coils 9 are wound around the tooth portions 62 of the individual first magnetic teeth 6 with the distance between the tooth portions 62 of the successive first magnetic teeth 6 increased as shown in FIG. 16.

After the driving coils 9 have been wound around the tooth portions 62 of the individual first magnetic teeth 6, the chain of the first magnetic teeth 6 is stretched in a straight form by bending the chain at the joints 61g as shown in FIG. 17. Then, the groove-shaped connecting parts 71a of the second magnetic teeth 7 and the groove-shaped connecting parts 81b of the third magnetic teeth 8 are fitted on the downward projecting connecting parts 61b of the first magnetic teeth 6, whereby the successive first magnetic teeth 6 are securely joined to one another and the second and third magnetic teeth 7, 8 are fixedly assembled with the first magnetic teeth 6 as shown in FIG. 15.

This embodiment is advantageous in that the aforementioned construction offers increased ease of handling of the first magnetic teeth 61, as the successive first magnetic teeth 61 are linked together by the flexible joints 61g in a bendable form.

Since the successive first magnetic teeth 61 are bent at the joints 61g to increase the distance between the tooth portions 62 as shown in FIG. 16, the driving coils 9 can be easily wound around the tooth portions 62 of the individual first magnetic teeth 6. Furthermore, this construction of the embodiment makes it possible to automatically wind the driving coils 9 at a high density.

While the first to third magnetic teeth 6, 7, 8 are formed by laminating electromagnetic steel sheets into single structures in the first to fourth embodiments described above, the invention is not limited to this structure. As an alternative, the invention may employ first to third magnetic teeth produced by sintering or injection-molding a magnetic powder material, for instance.

Fifth Embodiment

Figure 18:
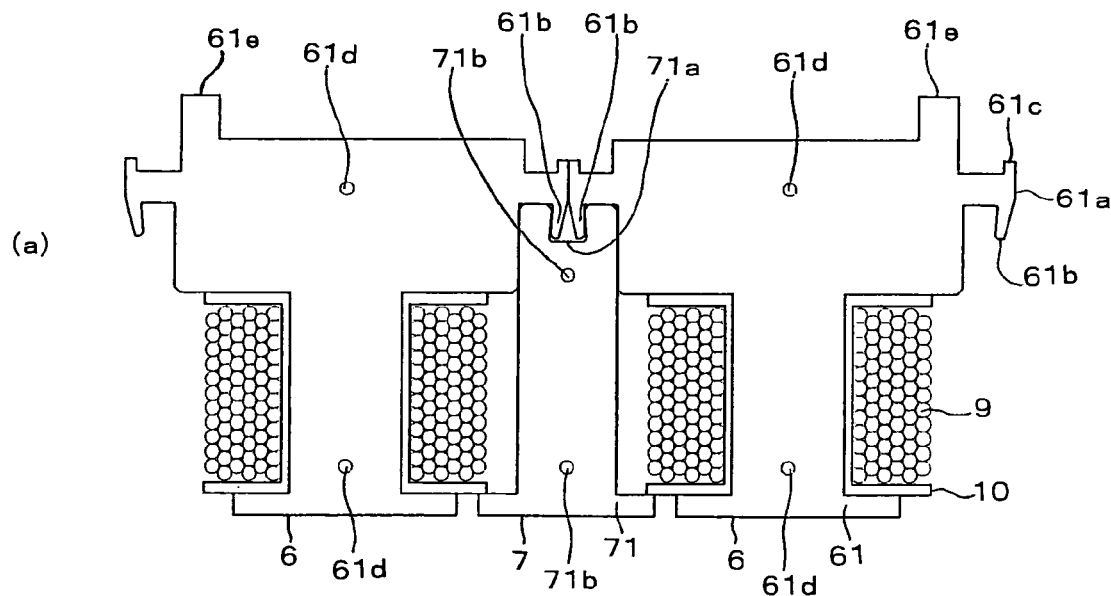
FIGS. 18A and 18B are diagrams showing a situation in which gaps are created between projecting connecting parts of a pair of adjacent first magnetic teeth and a dovetail groove-shaped connecting part of a third magnetic tooth.
Figure 18:
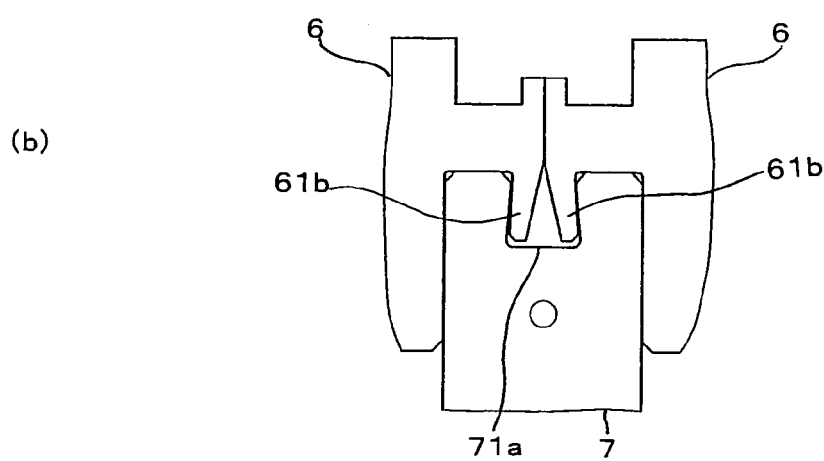

In the first to fourth embodiments described above, the dovetail groove-shaped connecting parts 71a are fitted on the downward projecting connecting parts 61b when each of the second magnetic teeth 7 is inserted between the adjacent first magnetic teeth 6. In this teeth-joining process, the projecting connecting parts 61b of each successive pair of adjacent first magnetic teeth 6 may plastically deform, creating gaps between the projecting connecting parts 61b and the dovetail groove-shaped connecting part 71a of the second magnetic tooth 7 as shown in FIGS. 18A and 18B.

Figure 19:
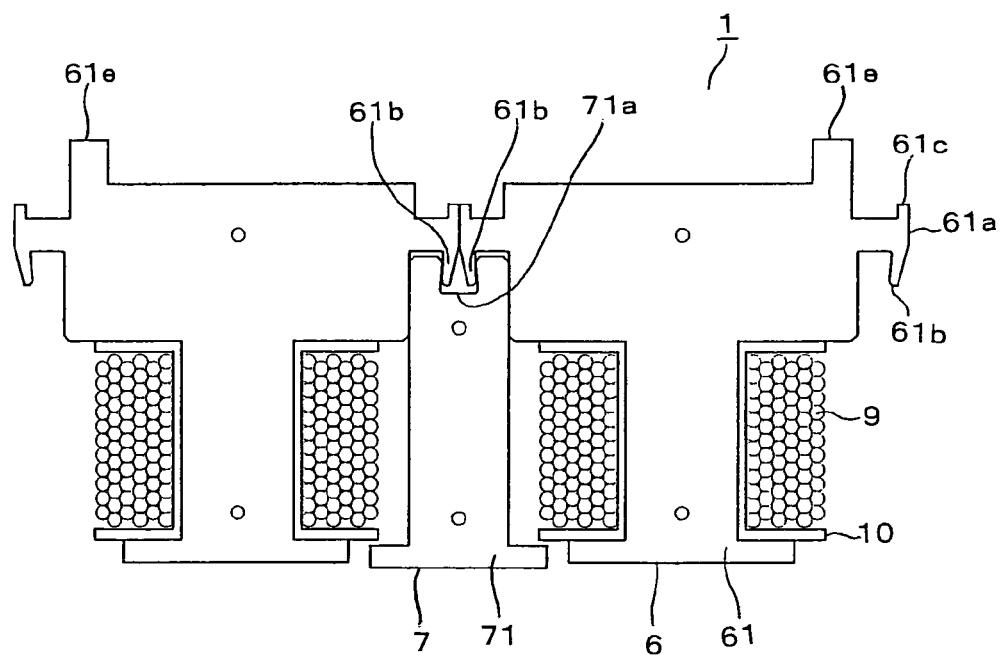
FIG. 19 is a diagram illustrating a problem which can occur when the dovetail groove-shaped connecting part of a third magnetic tooth is fitted on the projecting connecting parts of the adjacent first magnetic teeth.

If such gaps are created, the second magnetic tooth 7 may be displaced in a vertical direction with respect to the adjacent first magnetic teeth 6 as shown in FIG. 19 due to an external force applied to the armature 1. Furthermore, one of the adjacent first magnetic teeth 6 may be displaced together with the second magnetic tooth 7 in the vertical direction with respect to the other first magnetic tooth 6 as shown in FIG. 20.

If any of the first and second magnetic teeth 6, 7 become loosely joined due to gaps created between the projecting connecting parts 61b and the dovetail groove-shaped connecting part 71a of any second magnetic tooth 7, the first and/or second magnetic teeth 6, 7 would easily move during assembly process, causing degradation in assembling efficiency.

Figure 20:
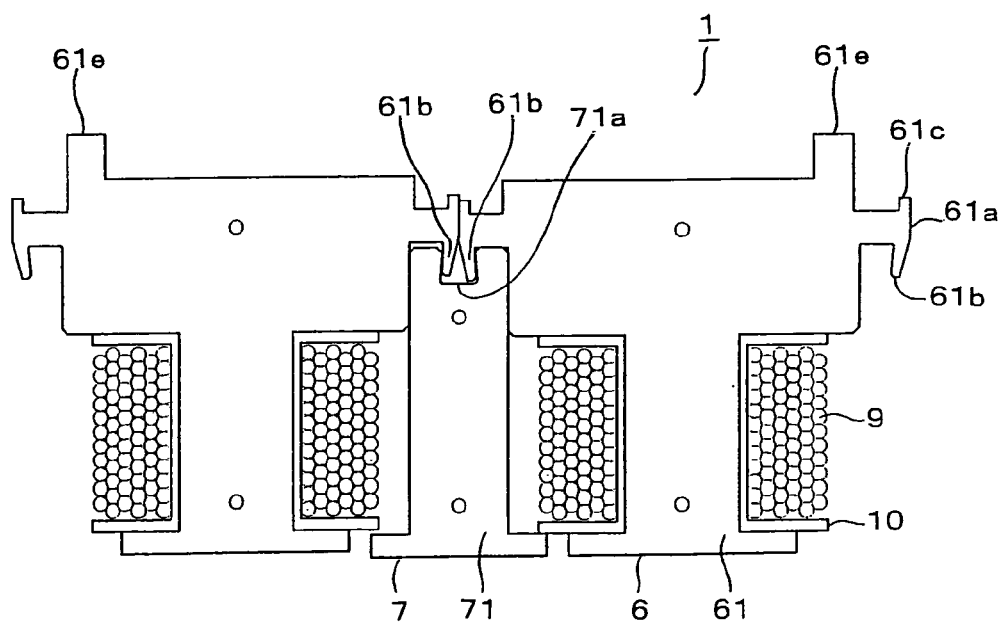
FIG. 20 is a diagram illustrating another problem which can occur when the dovetail groove-shaped connecting part of the third magnetic tooth is fitted on the projecting connecting parts of the adjacent first magnetic teeth.

If the assembly process of the armature 100 is finished under conditions where the second magnetic tooth 7 and/or the first magnetic tooth 6 is displaced in the vertical direction with respect to the adjacent first magnetic tooth 6 as shown in FIGS. 19 and 20, degradation in properties, such as thrust ripples, is likely to occur.

A fifth embodiment of the invention described below is particularly intended to provide a structure which would not cause degradation in assembling efficiency or properties of a linear motor by ensuring that no gaps are created between the projecting connecting parts 61b and the dovetail groove-shaped connecting parts 71a.

Figure 21:
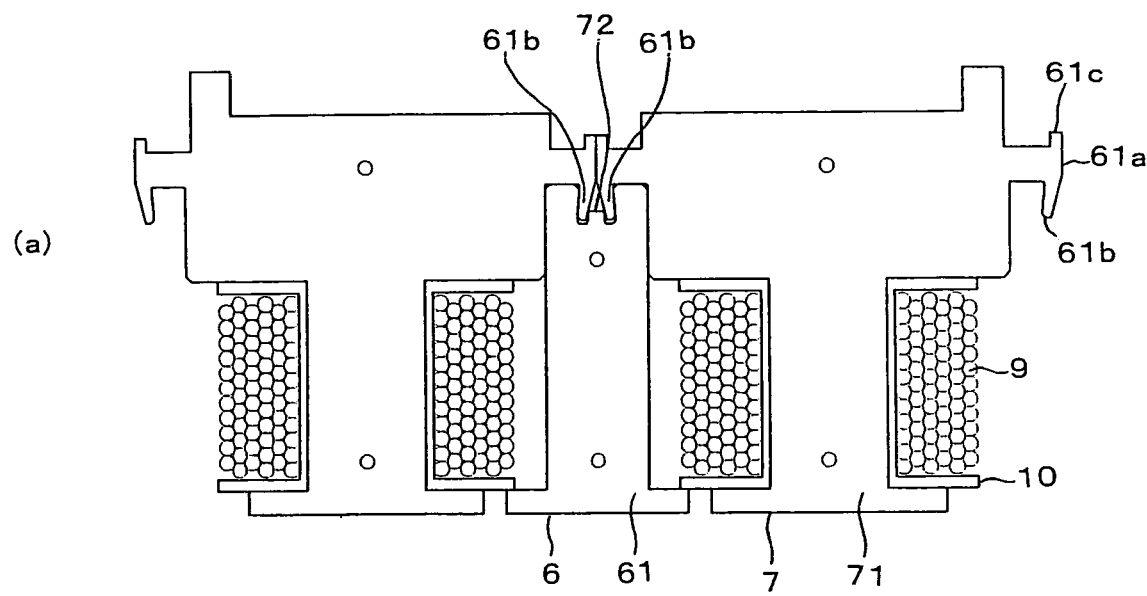
FIGS. 21A and 21B are sectional views showing a principal portion of an armature of a linear motor according to a fifth embodiment of the invention.
Figure 21:
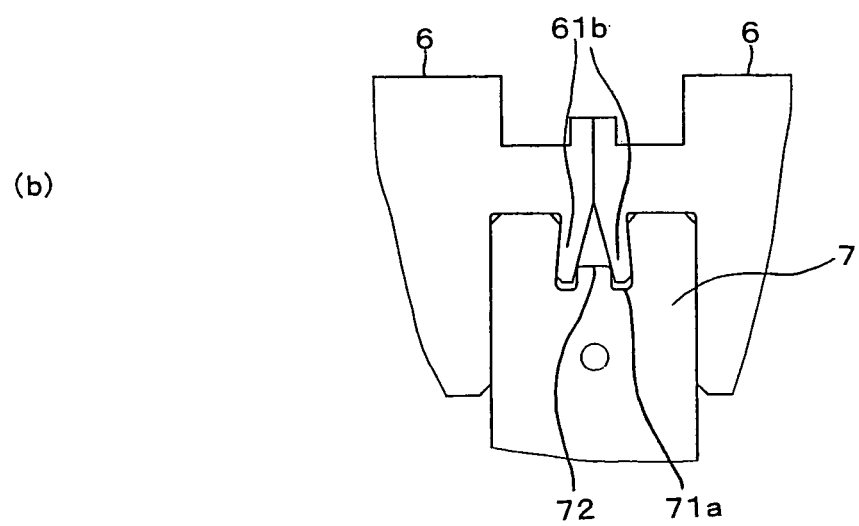
Figure 22:
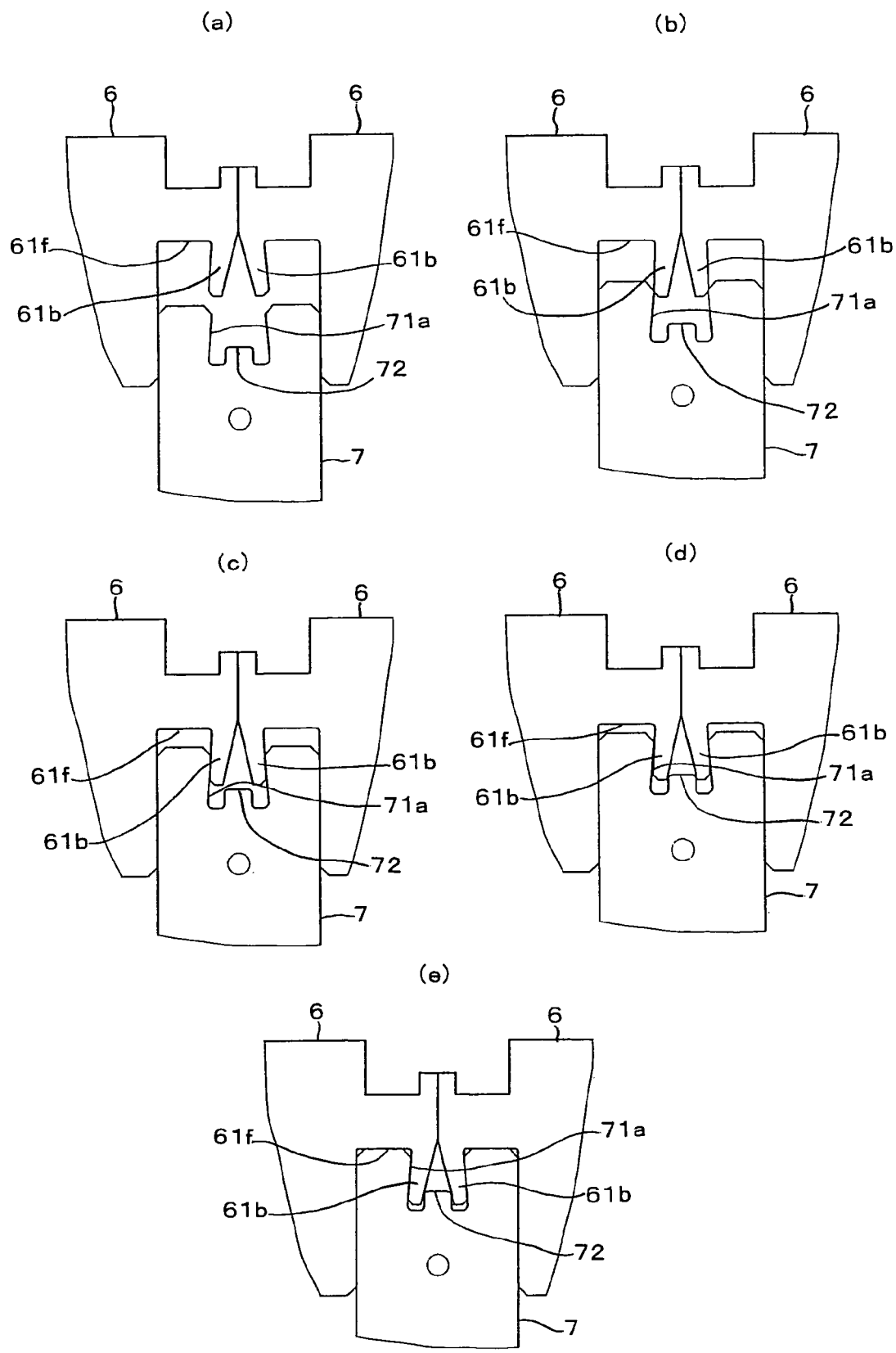
FIGS. 22A, 22B, 22C, 22D and 22E are sectional views showing how a connecting part positioner works.
Figure 23:
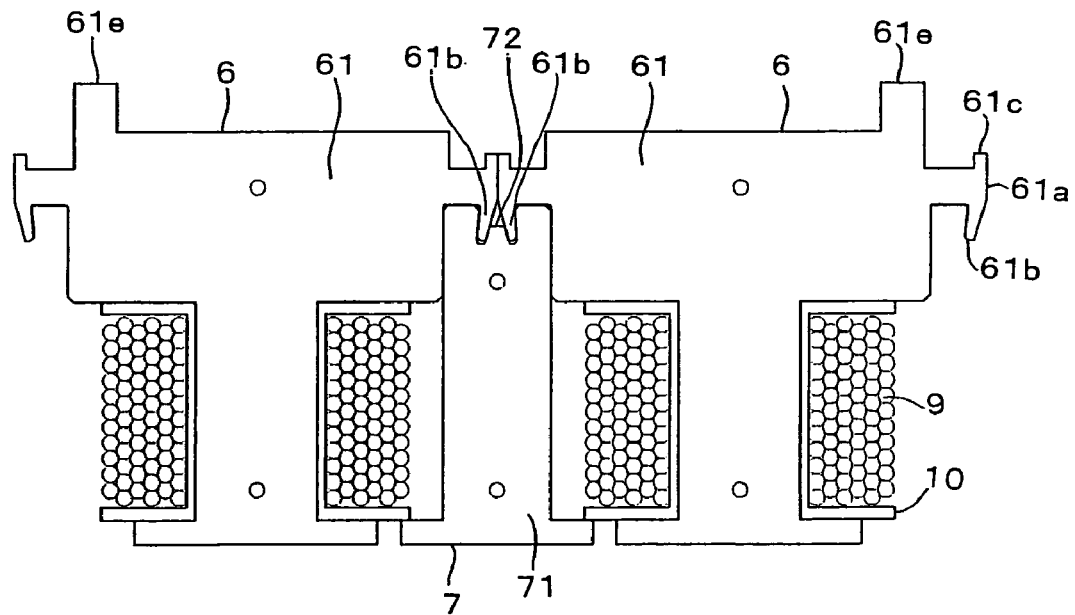
FIG. 23 is a sectional view showing a variation of the fifth embodiment.
Figure 24:
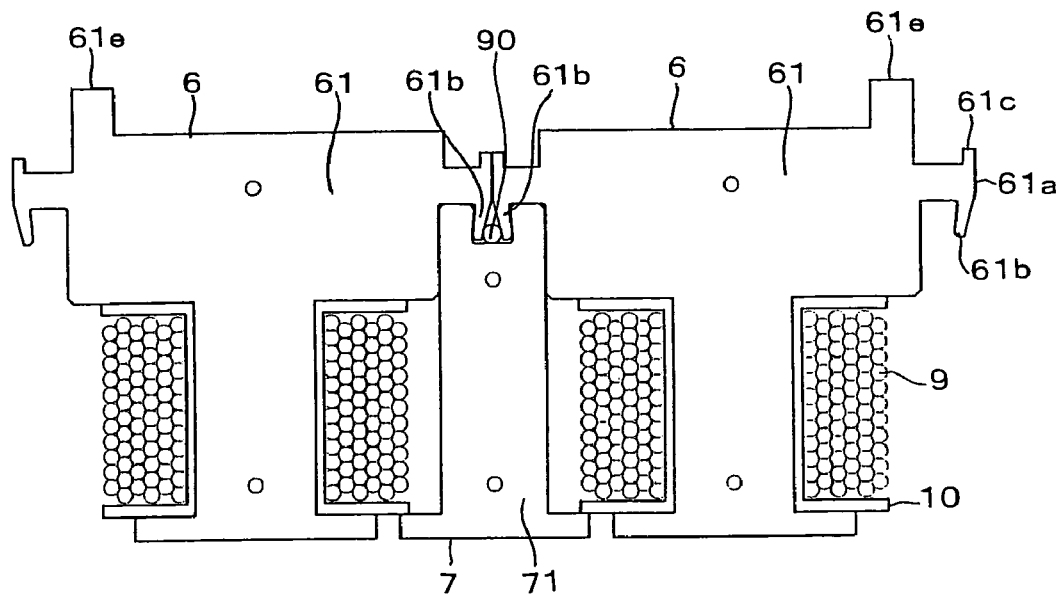
FIG. 24 is a sectional view showing another variation of the fifth embodiment.
Figure 25:
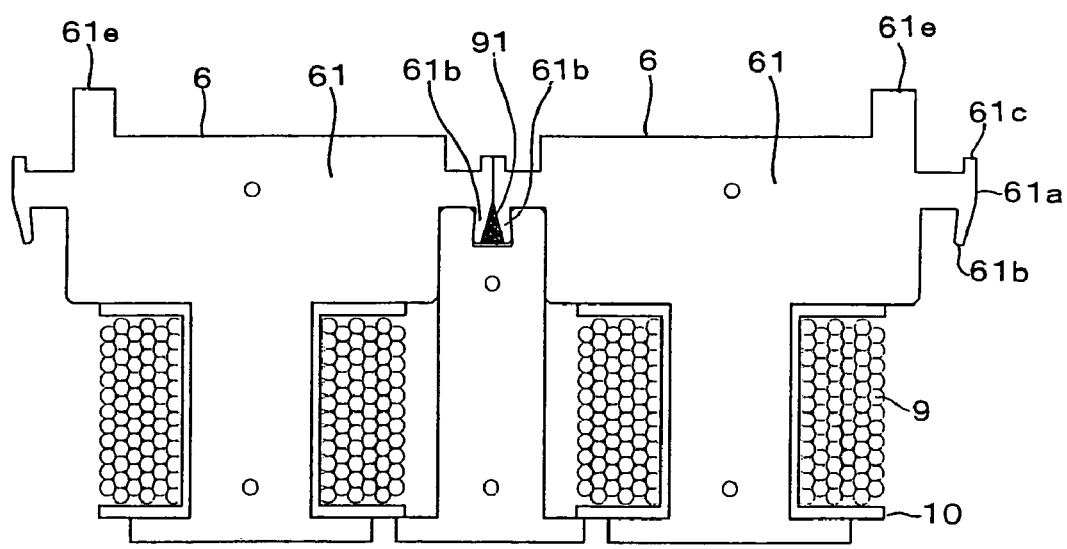
FIG. 25 is a sectional view showing still another variation of the fifth embodiment.

FIG. 21A is a sectional view of a principal portion of an armature 1 of a linear motor according to a fifth embodiment of the invention, FIG. 21B is an enlarged fragmentary sectional view showing part of the principal portion of FIG. 21A, FIGS. 22A–22E are sectional views showing how a connecting part positioner 72 works, and FIGS. 23–25 are sectional views showing alternative structures of the armature 1 of the fifth embodiment, in which elements identical or similar to those of the foregoing embodiments are designated by the same reference numerals.

In this embodiment, there is formed the aforementioned connecting part positioner 72 having a rectangular cross section protruding from a central part of the bottom of the dovetail groove-shaped connecting part 71a formed in each second magnetic tooth 7 as shown in FIGS. 21A and 21B. When the downward projecting connecting parts 61b of each successive pair of adjacent first magnetic teeth 6 are fitted into the dovetail groove-shaped connecting part 71a formed in each second magnetic tooth 7, the connecting part positioner 72 forces the connecting parts 61b to inner side walls of the connecting part 71a. Thus, the connecting part positioner 72 is located such that the projecting connecting parts 61b of the adjacent first magnetic teeth 6 settle on each side of the connecting part positioner 72 as illustrated.

The connecting part positioner 72 works as follows when each second magnetic tooth 7 is inserted between two adjacent first magnetic teeth 6 as illustrated in FIGS. 22A–22E. First, the second magnetic tooth 7 is inserted into the groove-shaped channel formed by a pair of cutouts 61f between the two adjacent first magnetic teeth 6 as shown in FIG. 22A. As the second magnetic tooth 7 is pushed in further between the two adjacent first magnetic teeth 6, the projecting connecting parts 61b come into contact with upper edges of the inner side walls of the connecting part 71a and are caused to deform in such a way that a gap between the two projecting connecting parts 61b becomes narrower as shown in FIG. 22B. If the second magnetic tooth 7 is further pushed in so that the projecting connecting parts 61b go into the dovetail groove-shaped connecting part 71a as shown in FIG. 22C, the gap between the projecting connecting parts 61b slightly increases due to their residual elasticity. However, the projecting connecting parts 61b still remain closer to each other due to plastic deformation. If the second magnetic tooth 7 is further pushed in from this position, the projecting connecting parts 61b go into contact with the connecting part positioner 72 formed on the bottom of the dovetail groove-shaped connecting part 71a with the projecting connecting parts 61b astride the connecting part positioner 72 as shown in FIG. 22D. If the second magnetic tooth 7 is further pushed in between the two adjacent first magnetic teeth 6, the plastically deformed projecting connecting parts 61b are forced outward by the connecting part positioner 72 so that the projecting connecting parts 61b return to an original shape they assumed before the plastic deformation occurred as shown in FIG. 22E. Consequently, the two projecting connecting parts 61b are forced against the inner side walls of the connecting part 71a, and with the projecting connecting parts 61b engaged with the connecting part 71a in this fashion, the second magnetic tooth 7 is firmly connected to the adjacent first magnetic teeth 6 and the first magnetic teeth 6 are securely joined to each other.

As the protruding raillike connecting part positioner 72 is formed on the bottom of the dovetail groove-shaped connecting part 71a of each second magnetic tooth 7, the two projecting connecting parts 61b settle astride the connecting part positioner 72 when fitted into the connecting part 71a as discussed above. The provision of the connecting part positioner 72 serves to prevent gaps from being created between the projecting connecting parts 61b and the side walls of the dovetail groove-shaped connecting part 71a of each second magnetic tooth 7 and the first and second magnetic teeth 6, 7 from moving in the vertical direction due to an external force so that none of the first and second magnetic teeth 6, 7 would be displaced with respect to the adjacent first magnetic tooth 6. Overall, the connecting part positioners 72 serve to prevent degradation in assembling efficiency and properties, such as thrust ripples.

While the connecting part positioner 72 has a rectangular protruding form in the fifth embodiment discussed above, the connecting part positioner 72 may be shaped into a trapezoidal form in cross section as shown in FIG. 23 in one variation of the embodiment. This variation offers the same advantageous effects as the fifth embodiment.

Also, while the connecting part positioner 72 having a protruding form in cross section is formed on the bottom of the dovetail groove-shaped connecting part 71a in the fifth embodiment, there may be placed a straight rod member 90 which comes into contact with inside surfaces of the two projecting connecting parts 61b and the bottom of the groove-shaped connecting part 71a instead of forming the connecting part positioner 72 as shown in FIG. 24 in another variation of the embodiment. This variation also offers the same advantageous effects as the fifth embodiment.

Furthermore, it is also possible to prevent the first and second magnetic teeth 6, 7 from being displaced in the vertical direction with respect to the adjacent first magnetic tooth 6 due to an external force by injecting or applying resin material 91 like synthetic adhesive to fill up a space formed in the dovetail groove-shaped connecting part 71a when the projecting connecting parts 61b are fitted therein as shown in FIG. 25.

Sixth Embodiment

Figure 26:
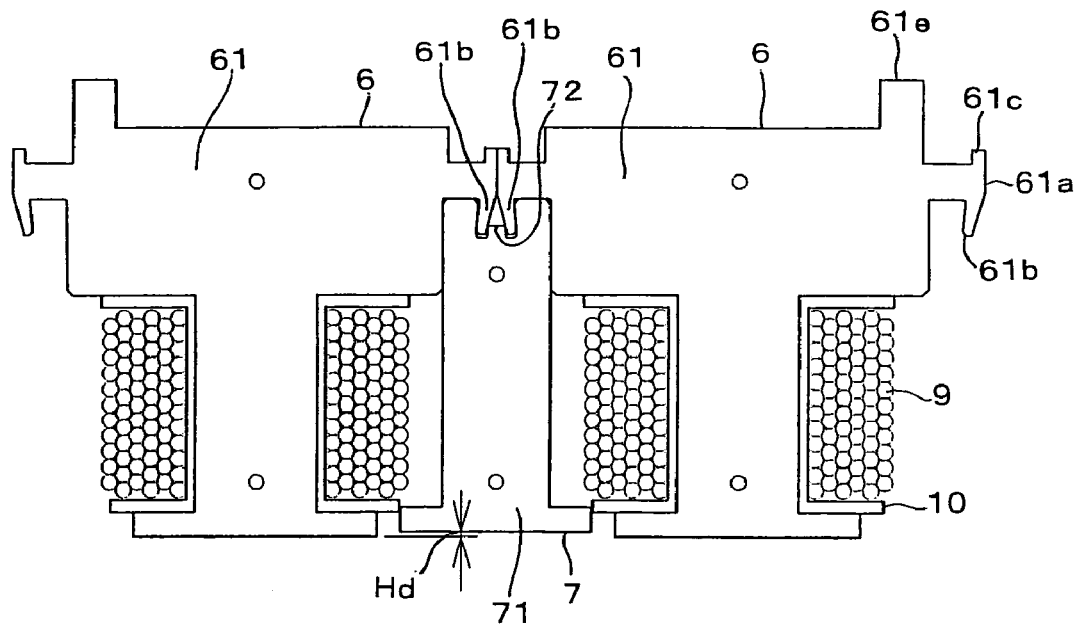
FIG. 26 is a sectional view of a principal portion of an armature of a linear motor according to a sixth embodiment of the invention.

FIG. 26 is a sectional view of a principal portion of an armature 1 of a linear motor according to a sixth embodiment of the invention, in which elements identical or similar to those of the foregoing embodiments are designated by the same reference numerals.

When the two connecting parts 61b of the adjacent first magnetic teeth 6 are pushed outward by the connecting part positioner 72 as in the fifth embodiment discussed above, the second magnetic tooth 7 fitted between the first magnetic teeth 6 may be forced back, causing an end surface of the second magnetic tooth 7 facing the stator 3 to protrude beyond end surfaces of the adjacent first magnetic teeth 6 facing the stator 3.

In this embodiment, the second magnetic teeth 7 are made shorter than the first magnetic teeth 6 so that the end surface of each second magnetic tooth 7 facing the stator 3 is recessed from (and does not protrude beyond) the end surfaces of the adjacent first magnetic teeth 6 facing the stator 3 by a specific amount Hd as illustrated in FIG. 26.

This construction the sixth embodiment, in which the end surface of each second magnetic tooth 7 is recessed from the end surfaces of the adjacent first magnetic teeth 6 by the specific amount Hd, serves to prevent degradation in assembling efficiency and properties, such as thrust ripples.

Seventh Embodiment

Figure 27:
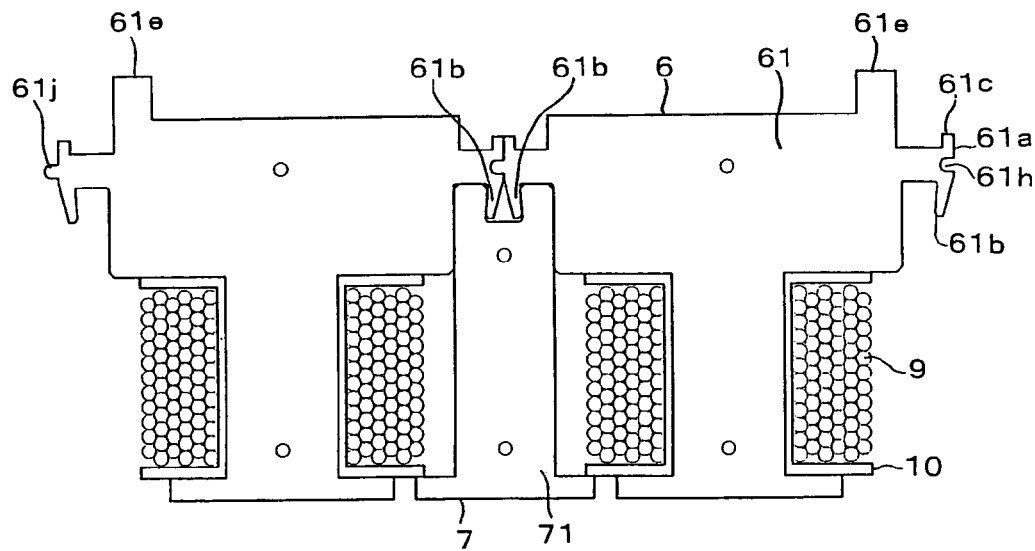
FIG. 27 is a sectional view showing a principal portion of an armature of a linear motor according to a seventh embodiment of the invention.
Figure 28:
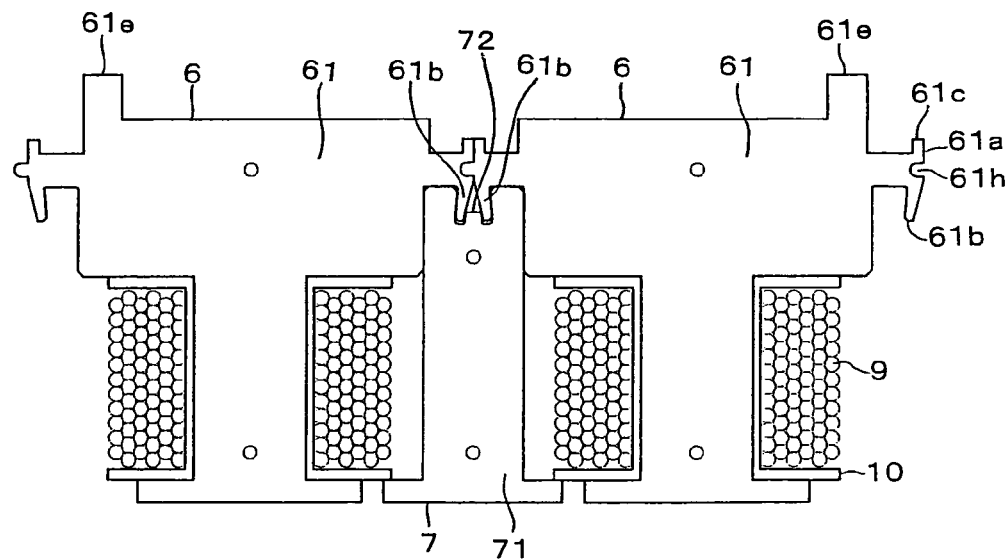
FIG. 28 is a sectional view showing a variation of the seventh embodiment.

FIG. 27 is a sectional view showing the construction of an armature 1 of a linear motor according to a seventh embodiment of the invention, and FIG. 28 is a sectional view showing a variation of the seventh embodiment, in which elements identical or similar to those of the foregoing embodiments are designated by the same reference numerals.

The aforementioned fifth and sixth embodiments employ the protruding raillike connecting part positioner 72 formed at the central part of the bottom of the dovetail groove-shaped connecting part 71a of each second magnetic tooth 7 to prevent the first and second magnetic teeth 6, 7 from being displaced in the vertical direction with respect to the adjacent first magnetic tooth 6 due to an external force. In contrast, there are formed a groove 61h and a protrusion 61j at opposite vertical end surfaces 61a of the yoke portion 61 of each first magnetic tooth 6 in the seventh embodiment of FIG. 27, so that the protrusion 61j formed on the vertical end surface 61a of one first magnetic tooth 6 fits in the groove 61h formed in the vertical end surface 61a of the adjacent first magnetic tooth 6 to prevent the two adjacent first magnetic teeth 6 from being displaced with respect to each other.

In the variation of the seventh embodiment shown in FIG. 28, each second magnetic tooth 7 has a connecting part positioner 72 formed at the central part of the bottom of the dovetail groove-shaped connecting part 71a. The groove 61h and the protrusion 61j for joining the adjacent first magnetic teeth 6 combined with the connecting part positioner 72 for retaining the projecting connecting parts 61b of the adjacent first magnetic teeth 6 in the dovetail groove-shaped connecting part 71a of each second magnetic tooth 7 serve to more securely prevent mutual displacement between the adjacent first magnetic teeth 6 and between the first and second magnetic teeth 6, 7 due to an external force.

While a pair of cutouts 61f is formed in each first magnetic tooth 6 and the driving coils 9 are not wound on the second magnetic teeth 7 in the illustrated examples of the aforementioned fifth to seventh embodiments, the constructions of the fifth to seventh embodiments are applicable even when the cutouts 61f are not formed in the first magnetic teeth 6 or the driving coils 9 are wound on both the first and second magnetic teeth 6, 7.

What is claimed is:

1. An armature of a linear motor including a plurality of magnetic teeth wound by driving coils, said magnetic teeth comprising:
    a plurality of first magnetic teeth arranged side by side in a linear form, each of the first magnetic teeth having a yoke portion and a tooth portion extending from the yoke portion toward a stator of the linear motor, each of the first magnetic teeth has an end surface and a connecting part; and
    a plurality of second magnetic teeth each located between the tooth portions of each successive pair of adjacent first magnetic teeth, each of the second magnetic teeth joining the two adjacent first magnetic teeth located on both sides thereof,
    wherein the end surfaces of the successive first magnetic teeth are held in face-to-face contact and the successive first magnetic teeth are joined to one another as the connecting parts of each successive pair of adjacent first magnetic teeth are connected by the second magnetic tooth located between the adjacent first magnetic teeth.

2. The armature of the linear motor according to claim 1, wherein the end surface of the first magnetic teeth is a vertical end surface and the connecting part is projecting downward from the vertical end surface on each side of the yoke portion while each of the second magnetic teeth has a dovetail groove-shaped connecting part, and wherein the vertical end surfaces of the successive first magnetic teeth are held in face-to-face contact and the successive first magnetic teeth are joined to one another as the projecting connecting parts of each successive pair of adjacent first magnetic teeth are fitted into the dovetail groove-shaped connecting part formed in the second magnetic tooth located between the adjacent first magnetic teeth.

3. The armature of the linear motor according to claim 2, wherein each of the first magnetic teeth has a cutout formed in each side of the yoke portion, and wherein an end of each of the second magnetic teeth in which the dovetail groove-shaped connecting part is formed is inserted into the cutout.

4. The armature of the linear motor according to claim 2, wherein there is provided a connecting part positioner having a protruding shape at the bottom of the dovetail groove-shaped connecting part formed in each of the second magnetic teeth so that the connecting part positioner forces the projecting connecting parts of each successive pair of adjacent first magnetic teeth to inner side walls of the dovetail groove-shaped connecting part.

5. The armature of the linear motor according to claim 4, wherein an end of each second magnetic tooth facing the stator is recessed from ends of the adjacent first magnetic teeth facing the stator.

6. The armature of the linear motor according to claim 2, wherein a groove is formed in one vertical end surface of the yoke portion of each first magnetic tooth and a protrusion is formed on the opposite vertical end surface of the yoke portion, and wherein the protrusion formed on the yoke portion of each first magnetic tooth fits into the groove formed in the yoke portion of the adjacent first magnetic tooth.

7. The armature of the linear motor according to claim 1, wherein driving coils are wound on one of the groups of the first magnetic teeth and of the second magnetic teeth.

8. The armature of the linear motor according to claim 1, wherein the successive first magnetic teeth are bendably joined in a chainlike form by flexible joints.

* * * * *